(12) United States Patent
Nishibe et al.

(10) Patent No.: US 7,487,225 B2
(45) Date of Patent: Feb. 3, 2009

(54) REGISTERING DEVICE AND METHOD, INFORMATION PROCESSING DEVICE AND METHOD, PROVIDING DEVICE AND METHOD, AND PROGRAM STORAGE MEDIUM

(75) Inventors: Mitsuhiro Nishibe, Tokyo (JP); Hirokazu Tsuchiya, Tokyo (JP); Takuya Kajikawa, Chiba (JP); Atsushi Sakaida, Tokyo (JP); Minoru Nagata, Kanagawa (JP); Motohiro Ohama, Kanagawa (JP); Yoshimichi Kitaya, Kanagawa (JP); Yoshihiro Tamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 805 days.

(21) Appl. No.: 09/926,007

(22) PCT Filed: Dec. 5, 2000

(86) PCT No.: PCT/JP00/08609

§ 371 (c)(1),
(2), (4) Date: Sep. 24, 2001

(87) PCT Pub. No.: WO01/44961

PCT Pub. Date: Jun. 21, 2001

(65) Prior Publication Data

US 2005/0076096 A1    Apr. 7, 2005

(30) Foreign Application Priority Data

Dec. 14, 1999  (JP)  .............. P11 354465
Dec. 14, 1999  (JP)  .............. P11 354466
Dec. 14, 1999  (JP)  .............. P11 354467

(51) Int. Cl.
*G06F 15/16*     (2006.01)
*G06F 11/30*     (2006.01)
*H04L 9/00*      (2006.01)

(52) U.S. Cl. .............. 709/219; 709/228; 709/229; 709/203; 713/190; 713/151; 713/153; 705/59

(58) Field of Classification Search .............. 707/104; 709/203, 219, 228, 229; 705/59; 713/190, 713/151, 153; 717/11; 726/5
See application file for complete search history.

(56) References Cited

U.S. PATENT DOCUMENTS 6,108,420 A * 8/2000 Larose et al. ............ 705/59
6,151,707 A * 11/2000 Hecksel et al. ........... 717/178

(Continued)

FOREIGN PATENT DOCUMENTS

JP    7-219762    8/1995

(Continued)

*Primary Examiner*—Philip C Lee
(74) *Attorney, Agent, or Firm*—Oblon, Spivak, McClelland, Maier & Neustadt, P.C.

(57) ABSTRACT

On receiving from a personal computer (1) a request for transmitting data for displaying a picture for inputting a user's profile in association with an MGID and an APID for specifying the personal computer (1), an EMD registration server (3) selects data recorded in correspondence to the APID based on the received APID and transmits the selected data to the personal computer (1). The EMD registration server (3) receivers the user's profile inputted based on the data from the personal computer (1) and records the user's profile in correspondence to the MGID.

9 Claims, 30 Drawing Sheets

U.S. PATENT DOCUMENTS

| | | | |
|---|---|---|---|
| 6,223,288 B1 * | 4/2001 | Byrne | 713/190 |
| 6,311,190 B1 * | 10/2001 | Bayer et al. | 707/104.1 |
| 6,343,323 B1 * | 1/2002 | Kalpio et al. | 709/229 |
| 6,353,849 B1 * | 3/2002 | Linsk | 709/203 |
| 6,374,359 B1 * | 4/2002 | Shrader et al. | 726/5 |
| 6,553,492 B1 * | 4/2003 | Hosoe | 713/153 |
| 6,748,528 B1 * | 6/2004 | Greenfield | 713/151 |
| 2002/0062382 A1 * | 5/2002 | Rhoads et al. | 709/228 |

FOREIGN PATENT DOCUMENTS

| | | |
|---|---|---|
| JP | 9-138771 | 5/1997 |
| JP | 9-179905 | 7/1997 |
| JP | 10-187752 | 7/1998 |
| JP | 11-203128 | 7/1999 |
| JP | 11-232066 | 8/1999 |
| JP | 11-259971 | 9/1999 |
| JP | 11-259977 | 9/1999 |
| JP | 11-331436 | 11/1999 |
| JP | 2000-112708 | 4/2000 |
| JP | 2000-148853 | 5/2000 |

\* cited by examiner

| APID | REGISTERED FORMAT |
|---|---|
| α α α α | 1 |
| β β β β | 2 |
| γ γ γ γ | 3 |
| ⋮ | ⋮ |

■ご連絡先
郵便番号　　　　　　　[　　　]－[　　　] (半角英数字)
都道府県　　　　　　　[下記からお選びください。▼]
市区町村郡(フリガナ)　[　　　　　　　　　] (全角カタカナ)
市区町村郡(全角)　　　[　　　　　　　　　]
町名・番地(フリガナ)　[　　　　　　　　　] (全角カタカナ)
町名・番地　　　　　　[　　　　　　　　　] (全角)
マンション・ビル地　　[　　　　　　　　　] (全角)
電話番号　　　　　　　[　　　　　　　] (半角数字)
FAX番号　　　　　　　 [　　　　　　　] (半角数字)
電子メールアドレス　　[　　　　　　　　　] (半角英数字)

■ご登録製品情報
ご購入機器の型名　　　[　　　　　　　]
製品(シリアル)番号　　[　　　　　　　　　] (半角数字)
ご購入日(西暦)　　　　[　　]年[　　]月[　　]日(半角数字)
販売元名　　　　　　　[　　　　　　　　　] (全角)

■本機をご利用いただく環境
パソコンメーカー名　　[下記からお選びください。▼]
パソコンのタイプ　　　[下記からお選びください。▼]
カスタマーID　　　　　[　　　　　　　]

■インターネット接続環境
インターネット接続環境[下記からお選びください。▼]
他にお使いのUSB機器をお持ちですか?
　　　　　はい○　いいえ○
今後情報をお送りしてよろしいですか?
　　　　　はい○　いいえ○

Demographics

| Field | Input |
|---|---|
| *First Name | [dropdown] [text field] |
| *Last Name | [text field] |
| *Address | [text field] |
| *City | [text field] |
| *State | [dropdown] |
| *Zip Code | [text field] |
| *Home Phone | [text field] |
| *Email | [text field] |
| Your Age (Optional) | [text field] |
| Gender (Optional) | Mail ○  Female ○ |
| Occupation (Optional) | *Click to Select* |

Product purchase information

*Model Number — *Click to Select*
*Serial Number — [text field]
The model number is printed on product packaging or instruction manual.

*Date Purchased — Month | Year

Source of product Purchase — *Click to Select* Others: [text field]

When did you decide to purchase this product? — *Click to Select*

Which of the following influenced your purchase decision? — ****Click to Select****

Did you buy this product for youself or did you receive as a gift?
○ Bought it for myself.
○ Received it as a gift Would you like to receive important software upgrade information?    Yes ○ No ○

What company manufactures your computer?    [dropdown]

What type of computer do you have?    Notebook ○ Desktop ○ Both ○

Is your primary connection to the internet?    ○ At home ○ At work ○ At school

Is your primary internet provider?    ○ AOL ○ Cmpuserve ○ Local ISP ○ Edu server Which of the following music web site do you visit reqularly?(Optional)    ****Click to Select****

Which acivities do you reqularly enjoy?(Optional)    ****Click to Select****

Please rate your level of agreement with the following statements.

I tend to buy new electronics as soon as they are available?
○ Strongly Agree ○ Somewhat Agree
○ Do Not Agree I generally wait for prices to come douwn before buying new electronics?
○ Strongly Agree ○ Somewhat Agree
○ Do Not Agree I would like to receive e-mail regarding promotions and special offers?    Yes ○ No ○

FIG.9

| MGID | CD KEY | USER PROFILE | APID |
|---|---|---|---|
| 1<br>2<br>3<br>4<br>⋮ | A<br>B<br>C<br>D<br>⋮ | i i i i<br>ro ro ro ro<br>—<br>—<br>⋮ | αααα<br>ββββ<br>—<br>—<br>⋮ |

| APID | REGISTRATION PAGE TYPE | NATION | LANGUAGE | PRODUCT TYPE NAME | INITIAL URL |
|---|---|---|---|---|---|
| 001-081-019-500100-2-0001 | MSWM | JP | JAPANESE | NW-MS7 | http://www.opening.com/jp/ |
| 001-081-019-500100-2-0002 | MC | JP | JAPANESE | MC-P10 | http://www.opening.com/jp/ |
| 001-081-019-500100-3-0001 | VAIO | JP | JAPANESE | | http://www.opening.com/jp/ |
| 001-001-008-500100-2-0001 | MSWM | US | ENGLISH | NW-MS7 | http://www.sony.com/musiclub.html |
| 001-001-008-500100-2-0002 | MC | US | ENGLISH | MC-P10 | http://www.sony.com/musiclub.html |

FIG.15

*First Name
*Last Name
*Address
*City
*State
*Zip Code
*Home Phone
*Email
Age (Optional)

How many people are in your household?(Optional)

Children (Under 13): [ ]
Teens (Under 13-19): [ ]
Adults (Over 19): [ ]

Gender (Optional)    Mail ○    Female ○
Occupation? (Optional)
Income (Optional)

Product purchase information
*Model Number         *Click to Select*
*Serial Number The model number is printed on product packaging or instruction manual.

Would you like to receive important software upgrade information?    Yes ○  No ○

What company manufactures your computer?

What type of computer do you have?    Notebook ○ Desktop ○ Both ○

Where did you purchase your Music Clip?    Best Buy

*Date Purchased

FIG.20

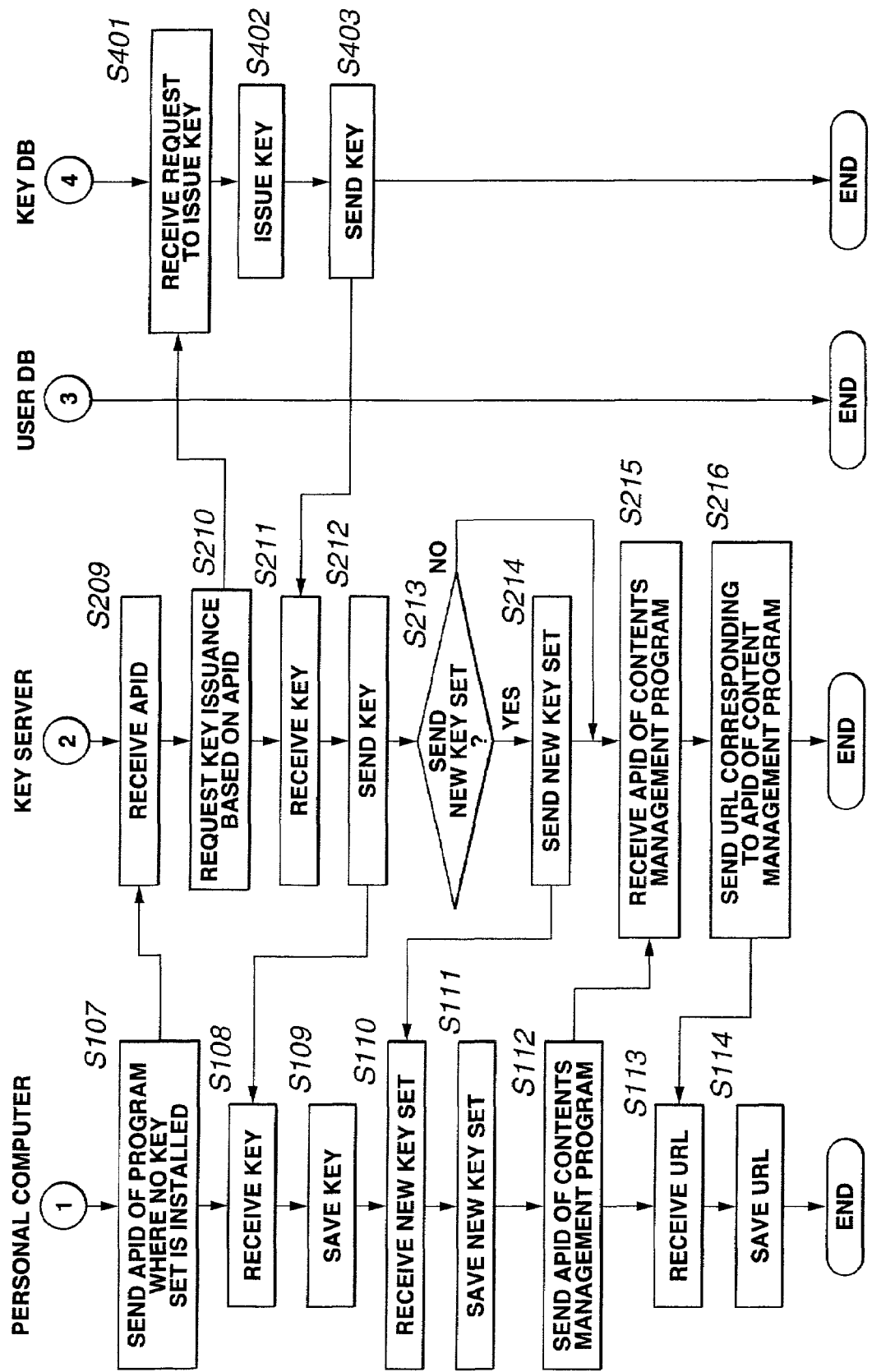

REGISTERING DEVICE AND METHOD, INFORMATION PROCESSING DEVICE AND METHOD, PROVIDING DEVICE AND METHOD, AND PROGRAM STORAGE MEDIUM

TECHNICAL FIELD

This invention relates to a registration method and apparatus, an information processing method and apparatus, a furnishing method and apparatus and a program storage medium and, more particularly, to a registration method and apparatus and a program storage medium for registering data pertinent to users, and to an information processing method and apparatus, a furnishing method and apparatus and a program storage medium for furnishing data for downloading contents or data specifying the location of a contents furnishing device. More particularly, the present invention relates to a method and apparatus and a program storage medium for furnishing a key.

BACKGROUND ART

When receiving contents as data such as music from a predetermined server over a network, a user transmits to a registration server data pertinent to the user, such as name or an E-mail address, prior to reception of contents, for registration of the transmitted data pertinent to the user.

When the registration is finished, the registration server transmits a key necessary for authentication processing to an information processing apparatus of the user.

In such registration, the user has to select a registration form or a server furnishing the contents, in meeting with the language or an apparatus used, which means a laborious operation.

On the other hand, the server has to execute two operations of registering a user and issuing a key, thus imposing significant processing load to render expeditious processing difficult.

Moreover, since the location of the registration server is obvious, illicit aggression is liable to occur, with the result that processing load for dealing with the aggression tends to be increased.

DISCLOSURE OF THE INVENTION

It is therefore an object of the present invention to provide a registration method and apparatus, an information processing method and apparatus, a furnishing method and apparatus and a program storage medium whereby a user is able to input own data more readily, connection can be made after registration to a server furnishing the contents more suited to attributes such as the language to be used by the user, and a key can be issued more safely and promptly.

In one aspect, the present invention provides a registration apparatus including first recording means for recording second data for displaying a picture for inputting first data specifying a user for registration, in association with attributes relevant to the user, first receiving means for receiving, from an information processing device used by the user, a transmission request for transmission of the second data, along with third data specifying the information processing device and the attributes, selection means for selecting the second data recorded in the recording means, based on the attributes received by the first receiving means, transmission means for transmitting the second data selected by the selection means to the information processing device, second receiving means for receiving the first data which specifies the user and which has been input from the information processing device based on the second data, and second recording means for recording the first data in association with the third data specifying the information processing device used by the user.

The first receiving means preferably receives the information indicating the language as the attribute. The first receiving means preferably receives the information indicating a terminal device used by being connected to the information processing device as the attribute.

In a second aspect, the present invention provides a registration method including a first recording step of recording second data for displaying a picture for inputting first data specifying a user for registration, in association with attributes relevant to the user, a first receiving step of receiving, from an information processing device used by the user, a transmission request for transmission of the second data, along with third data specifying the information processing device and the attributes, a selection step of selecting the second data recorded in the recording step, based on the attributes received by the first receiving step, a transmission step of transmitting the second data selected by the selection step to the information processing device, a second receiving step of receiving the first data which specifies the user and which has been input from the information processing device based on the second data and a second recording step of recording the first data in association with the third data specifying the information processing device used by the user.

In a third aspect, the present invention provides a program storage medium having stored therein a computer-readable program, which program includes a first receiving step of receiving, from an information processing device used by the user, a transmission request for transmission of third data, along with first data specifying the information processing device used by a user and attributes relevant to the user, the third data demonstrating a picture for inputting second data specifying the user, a selection step of selecting the third data recorded in the first recording step, based on the attributes received by the first receiving step, a transmission step of transmitting the third data selected by the selection step to the information processing device, a second receiving step of receiving the second data which specifies the user and which has been input from the information processing device based on the third data, and a second recording step of recording the second data in association with the first data specifying the information processing device used by the user.

In the registration apparatus of the first aspect and in the registration method of the second aspect, second data for demonstrating a picture for inputting first data for specifying a user is recorded, a request for transmitting selected second data is received from the information processing device along with the third data specifying the information processing device used by the user and attributes, the recorded second data is selected based on the received attributes, recorded second data is selected based on the received attributes, selected second data is transmitted to the information processing device, the first data which has been input based on the second data and which specifies the user is received from the information processing device, and first data is recorded in association with the third data specifying the information processing device used by the user. So, the user is able to input the data relevant to itself more readily.

In the program storage medium in the third aspect of the present invention, the request for transmitting third data for demonstrating a picture for inputting second data specifying a user is received from the information processing device used by the user, along with the first data specifying the information processing device and attributes relevant to the user. The third data recorded in association with the attribute is selected based on the received attributes. The third data so selected is transmitted to the information processing device. From this information processing device, second data specifying the user and which has been input based on the third data is received. The second data is recorded in association with the first data specifying the information processing device and attributes relevant to the user. So, the user is able to input the data relevant to itself more readily.

In a fourth aspect of the present invention, there is provided an information processing apparatus including acquisition means for acquiring data specifying the location of a registration device, transmission means for transmitting attributes relevant to the user to a first furnishing device on completion of registration of a user in the registration device, receiving means for receiving data indicating the location of a second furnishing device corresponding to the attributes relevant to the user from the first furnishing device, and communication means for requesting registration of the user to the registration device, based on data acquired by the acquisition means and which specify the location of a registration device. The communication means also communicates with the second furnishing device based on data acquired by the receiving means and which specify the location of the second furnishing device.

The transmission means preferably transmits the information specifying the language as the attribute. The transmission means preferably transmits the information used on coupling to itself.

In a fifth aspect of the present invention, there is provided an information processing method including an acquisition step of acquiring data specifying the location of a registration device, a transmission step of transmitting attributes relevant to the user to first furnishing device on completion of registration of a user in the registration device, a receiving step of receiving data indicating the location of a second furnishing device corresponding to the attributes relevant to the user from the first furnishing device, and a communication step of requesting registration of the user to the registration device, based on data acquired by the acquisition means and which specify the location of a registration device. The communication step also communicates with the second furnishing device based on data acquired by the receiving step and which specify the location of the second furnishing device.

In a sixth aspect of the present invention, there is provided a program storage medium having stored therein a computer-readable program, which program includes an acquisition step of acquiring data specifying the location of a registration device, a transmission step of transmitting attributes relevant to the user to first furnishing device on completion of registration of a user in the registration device, a receiving step of receiving data indicating the location of a second furnishing device corresponding to the attributes relevant to the user from the first furnishing device, and a communication step of requesting registration of the user to the registration device, based on data acquired by the acquisition means and which specify the location of a registration device, the communication step also communicating with the second furnishing device based on data acquired by the receiving step and which specify the location of the second furnishing device.

In a seventh aspect, the present invention provides a furnishing apparatus including recording means for recording data specifying the location of a contents furnishing device furnishing the contents in association with attributes relevant to a user of the information processing device, receiving means for receiving the attributes relevant to a user from the information processing device, selecting means for selecting the data indicating the location of the contents furnishing device which is recorded in the recording means and which indicates the location of the contents furnishing device, based on the attributes received in the receiving step, and transmission means for transmitting to the information processing device the data which indicates the location of the contents furnishing device furnishing the contents and which is selected by the selection means.

Preferably, the first receiving means receives the information indicating the language as the attribute. Preferably, the first receiving means receives the information indicating a terminal device used by being connected to the information processing device as the attribute.

In an eighth aspect of the present invention, there is provided a furnishing method including a recording step of recording data specifying the location of a contents furnishing device furnishing the contents in association with attributes relevant to a user of the information processing device, a receiving step of receiving the attributes relevant to a user from the information processing device, a selecting step of selecting the data indicating the location of the contents furnishing device which is recorded in the recording step and which indicates the location of the contents furnishing device, based on the attributes received in the receiving step, and a transmission step of transmitting to the information processing device the data which indicates the location of the contents furnishing device furnishing the contents and which is selected in the selection step.

In a ninth aspect of the present invention, there is provided a program storage medium having stored therein a computer-readable program, which program includes an acquisition step of acquiring attributes relevant to a user and which has been furnished from an information processing device, a selection step of selecting data indicating the location of the contents furnishing device pre-recorded in association with the attributes of the information processing device relevant to the user, based on the attributes obtained in the acquisition step, and a transmission step of transmitting to the information processing device the data which indicates the location of the contents furnishing device furnishing the contents and which is selected in the selection step.

In the information processing apparatus, information processing method and in the program of the program storage medium, according to the fourth, fifth and sixth aspects of the present invention, respectively, data indicating the location of the registration device is acquired and, when the user registration in the registration apparatus is finished, the attributes relevant to the user is received. A request is made for registering the user in the registration device, based on the data indicating the location of the registration device, so acquired, whilst communication may be had with the second furnishing device based on the data specifying the location of the second furnishing device. So, after registration, it is possible to establish the connection with the second furnishing device suited to the user attributes more readily.

In the furnishing apparatus and in the furnishing method in the seventh and eighth aspects of the present invention, data indicating the locations of the content furnishing apparatus is recorded in association with the attributes relevant to the user of the information processing device and the attributes relevant to the user are received from the information processing device. Based on the received attributes, the recorded data indicating the location of the content furnishing device is selected and the so-selected data specifying the location of the content furnishing device is transmitted to the information processing device. So, after registration, it is possible to establish the connection with the second furnishing device suited to the user attributes more readily.

In a ninth aspect of the present invention, there is provided a program for the program storage medium in which the attributes relevant to a user supplied from the information processing device are acquired, data indicating the location of the content furnishing device and which is pre-recorded in association with the attributes relevant to the user of the information processing device is selected based on the so-acquired attributes, and data indicating the location of the content furnishing device is transmitted to the information processing device. So, after registration, it is possible to establish the connection with the second furnishing device suited to the user attributes more readily.

In a tenth aspect of the present invention, there is provided a furnishing apparatus including first receiving means for receiving from a first information processing device, along with first data specifying the first information processing device and second data indicating a program in need of a key, a request for transmission of the key, requesting means for requesting decision as to whether or not the first information processing device has been registered, second receiving means for receiving from the second information processing device the results of decision as to whether or not the first information processing device has been registered, key generating means for generating the key associated with the program on receipt of the result of decision that the first information processing device has been registered, and transmission means for transmitting the generated key to the first information processing device.

In an eleventh aspect of the present invention, there is provided a furnishing method including a first receiving step of receiving from a first information processing device, along with first data specifying the first information processing device and second data indicating a program in need of a key, a request for transmission of the key, a requesting step of requesting decision as to whether or not the first information processing device has been registered, a second receiving step of receiving from the second information processing device the results of decision as to whether or not the first information processing device has been registered, a key generating step of generating the key associated with the program on receipt of the result of decision that the first information processing device has been registered and a transmission step of transmitting the generated key to the first information processing device.

In a twelfth aspect of the present invention, there is provided a program storage medium having stored therein a computer-readable program, which program includes a first receiving step of receiving from a first information processing device, along with first data specifying the first information processing device and second data indicating a program in need of a key, a request for transmission of the key, a requesting step of requesting decision as to whether or not the first information processing device has been registered, a second receiving step of receiving from the second information processing device the results of decision as to whether or not the first information processing device has been registered, a key generating step of generating the key associated with the program on receipt of the result of decision that the first information processing device has been registered and a transmission step of transmitting the generated key to the first information processing device.

In the furnishing device and method in the tenth and eleventh aspects of the present invention and in the program storage medium in the twelfth aspect of the present invention, a key transmission request is received from the first information processing device, along with the first data specifying the first data and the second data specifying the program in need of the key, and the second information processing device is requested to check whether or not the first registration device has been registered. If the result of check to the effect that the first registration device has been registered is received, a key corresponding to the program is generated and the key so-generated is transmitted to the first information processing device. So, it is possible to issue the key more promptly and safely.

BRIEF DESCRIPTION OF THE DRAWINGS

FIG. 7 shows, in a tabulated form, the relation of correspondence between an application program ID and a registration form.

FIG. 8 illustrates a typical registration form.

FIG. 9 illustrates a typical registration form.

FIG. 10 shows typical examples of MGID, CD key, profile data of a registered user, and $APID_{OMG}$, registered by the EMD registration server.

FIG. 13 illustrates a typical registration form.

FIG. 15 shows, in a tabulated form, the relation of correspondence between URL and $APID_{OMG}$ pre-recorded by a key server.

FIG. 20 illustrates a typical registration form.

FIG. 30 is a flowchart for illustrating details in the processing for key downloading.

BEST MODE FOR CARRYING OUT THE INVENTION

Figure 1:
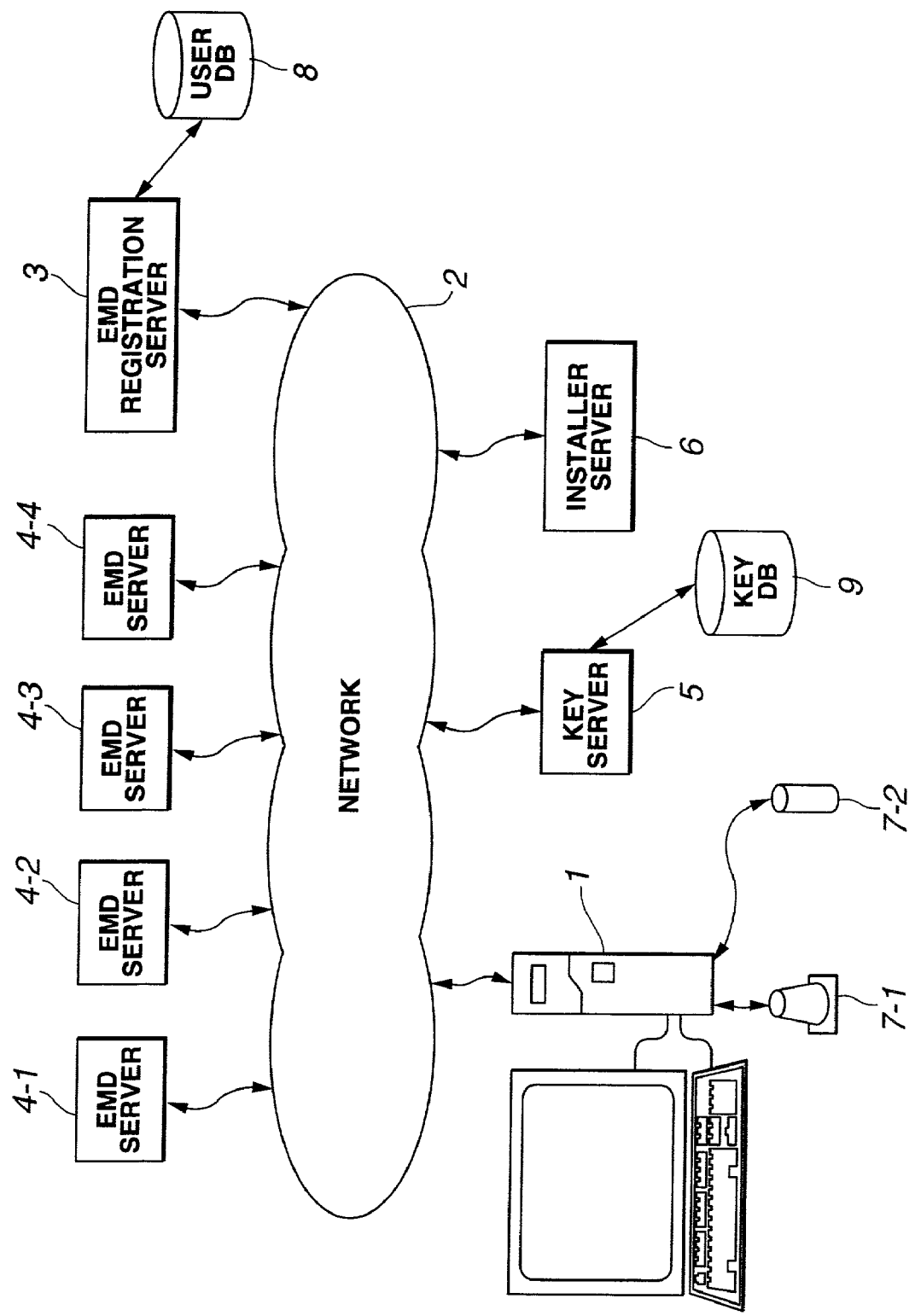
FIG. 1 shows an embodiment of a music data management system according to the present invention.

FIG. 1 shows an embodiment of a music data management system according to the present invention. A personal computer 1 is connected to a network 2 comprised of the Local Area Network or the Internet. The personal computer 1 converts music data received from an EMD (Electrical Music Distribution) servers 4-1 to 4-4 or read out from the Compact Disc (CD), referred to below as contents, into a pre-set compression form, such as ATRAC3 (trade mark) using a pre-set key, while encrypting the music data in accordance with the description (Data Encryption Standard) and recording the encrypted data.

A program executed by the personal computer 1 for constituting the music data management system according to the present invention is installed from a CD-ROM (CD Read-Only Memory) furnished in association with portable device (PD) 7-1 or 7-2, such as so-called bundled CD-ROM furnished with the portable device 7-1 in purchasing the portable device 7-1, or is downloaded and installed from an installer server 6 over the network 2.

The program recorded in a CD-ROM furnished in association with the portable device 7-1 has a different program portion from the program recorded in a CD-ROM furnished in association with portable device (PD) 7-1.

When installing a program recorded on a CD-ROM furnished in association with the portable device 7-1, the program for installing the program on the personal computer 1 (installing program as later explained) records the URL (Uniform Resource Locator) for accessing the EMD registration server 3, in a pre-set file, such as a registry.

When installing the program recorded on a CD-ROM furnished in association with the portable device 7-2, the program for installing the program on the personal computer 1 records the URL for accessing the EMD registration server 3 in a pre-set file, such as a registry.

In the music data management system, the key for authenticating a device driver of the portable device 7-1 is read out from the CD-ROM, furnished in association with the portable device 7-1, so as to be recorded on the personal computer 1. In the music data management system, the key for authenticating a device driver of the portable device 7-2 is read out from the CD-ROM, furnished in association with the portable device 7-2, so as to be recorded on the personal computer 1.

For example, a user using only the portable device 7-1 in the music data management system according to the present invention, and who has purchased the portable device 7-2, is able to utilize both the portable device 7-1 and the portable device 7-2, if the or she installs the program associated with the portable device 7-2 from the CD-ROM furnished in association with the portable device 7-2.

The program executed by the personal computer 1 for constituting the music data management system will be explained in detail subsequently.

The personal computer 1 records using condition data specifying using conditions of the contents in association with the contents recorded encrypted. The using condition data indicate e.g., that the contents associated with the using condition data can be utilized or copied simultaneously on three portable devices, namely the portable devices 7-1 and 7-2 and another portable device, not shown, or moved to another personal computer.

The personal computer 1 causes the contents, recorded encrypted, to be stored in the portable device 7-1, connected in circuit, while causing the using condition data corresponding to the stored contents to be updated responsive to the storage in the portable device 7-1. This operation is referred to below as check-out. The personal computer 1 also causes the contents, recorded encrypted, to be stored in the portable device 7-2, connected in circuit, while causing the using condition data corresponding to the stored contents to be updated responsive to the storage in the portable device 7-2.

Moreover, the personal computer 1 causes the contents stored in the portable device 7-1 connected in circuit to be erased by the portable device 7-1, while causing the using condition data corresponding to the erased contents to be updated. This operation is referred to below as check-in. The personal computer 1 also causes the contents stored in the portable device 7-2 connected in circuit to be erased by the portable device 7-2, while causing the using condition data corresponding to the erased contents to be updated.

When the user of the personal computer 1 starts to acquire contents from the EMD servers 4-1 to 4-4, the personal computer 1 transmits to the EMD registration server 3 data proper to the program installed on the personal computer 1 (inherent data different from the data of the same program of the other personal computer) and data indicating the portable device coped with by the program installed on the personal computer 1, for example, the portable device 7-1 or 7-2, and the language used in a nation of sale of the portable device coped with by the program.

Based on the data, received from the personal computer 1, indicating the portable device coped with by the program installed on the personal computer 1, and the language used in a nation of sale of the portable device coped with by the program, the EMD registration server 3 transmits to the personal computer 1 data for displaying a picture for inputting the name or the E-mail address of the user of the personal computer 1, referred to below as the user profile, associated with the portable device and the language. This data is what is called data for displaying the registration form.

The personal computer 1 receives data for displaying the registration form, associated with the portable device and the language, to display the registration form. When the pre-set data, such as the name or the E-mail address of the user, is set on the registration form, the personal computer 1 transmits profile data of the user as set in the registration form to the EMD registration server 3.

On receipt of data of the user profile from the personal computer 1, the EMD registration server 3 records the data proper to the program installed on the personal computer 1 in association with the user profile data in a user database.

The installer server 6 transmits to the personal computer 1 a program for downloading a key from the key server 5 to the personal computer 1 (a key installing program as later explained). This key is to be used in a processing of authenticating the program for downloading the contents from the EMD servers 4-1 to 4-4. On receipt of the key installing program from the installer server 6, the personal computer 1 installs the key installing program in itself.

If the user profile has been registered in a user database 8, the key server 5 is responsive to a request from the personal computer 1 to cause a key database 9 to generate a key necessary for downloading the contents from the EMD servers 4-1 to 4-4 to transmit the generated key to the personal computer 1. The personal computer 1 receives the key necessary for downloading the contents from the EMD servers 4-1 to 4-4 to save the received key.

The EMD server 4-1 is responsive to the request from the personal computer 1 to furnish the contents to the personal computer 1 over the network 2. The EMD server 4-2 is responsive to the request from the personal computer 1 to furnish the contents to the personal computer 1 over the network 2. The EMD server 4-3 is responsive to the request from the personal computer 1 to furnish the contents to the personal computer 1 over the network 2. The EMD server 4-4 is responsive to the request from the personal computer 1 to furnish the contents to the personal computer 1 over the network 2.

The contents furnished by each of the EMD servers 4-1 to 4-4 have been compressed in accordance with the same or different compression system(s). The contents furnished by each of the EMD servers 4-1 to 4-4 have been encrypted in accordance with the same or different encryption system(s).

The portable device 7-1 stores the contents furnished from the personal computer 1, that is the checked-out contents. The portable device 7-1 reproduces the stored contents to output the reproduced contents to e.g., a headphone, not shown. The user may dismount the portable device 7-1, having the contents stored therein, from the personal computer 1, carry it about and reproduce the stored contents to hear the music corresponding to the contents over e.g., a headphone.

The portable device 7-2 memorizes the contents furnished from the picture printing system 1. The portable device 7-2 reproduces the contents stored therein to output the reproduced contents to a headphone, not shown. The user is able to dismount the portable device 7-2, having the contents stored therein, from the personal computer 1, carry it about and reproduce the contents stored therein to hear the music corresponding to the contents over e.g., a headphone.

Figure 2:
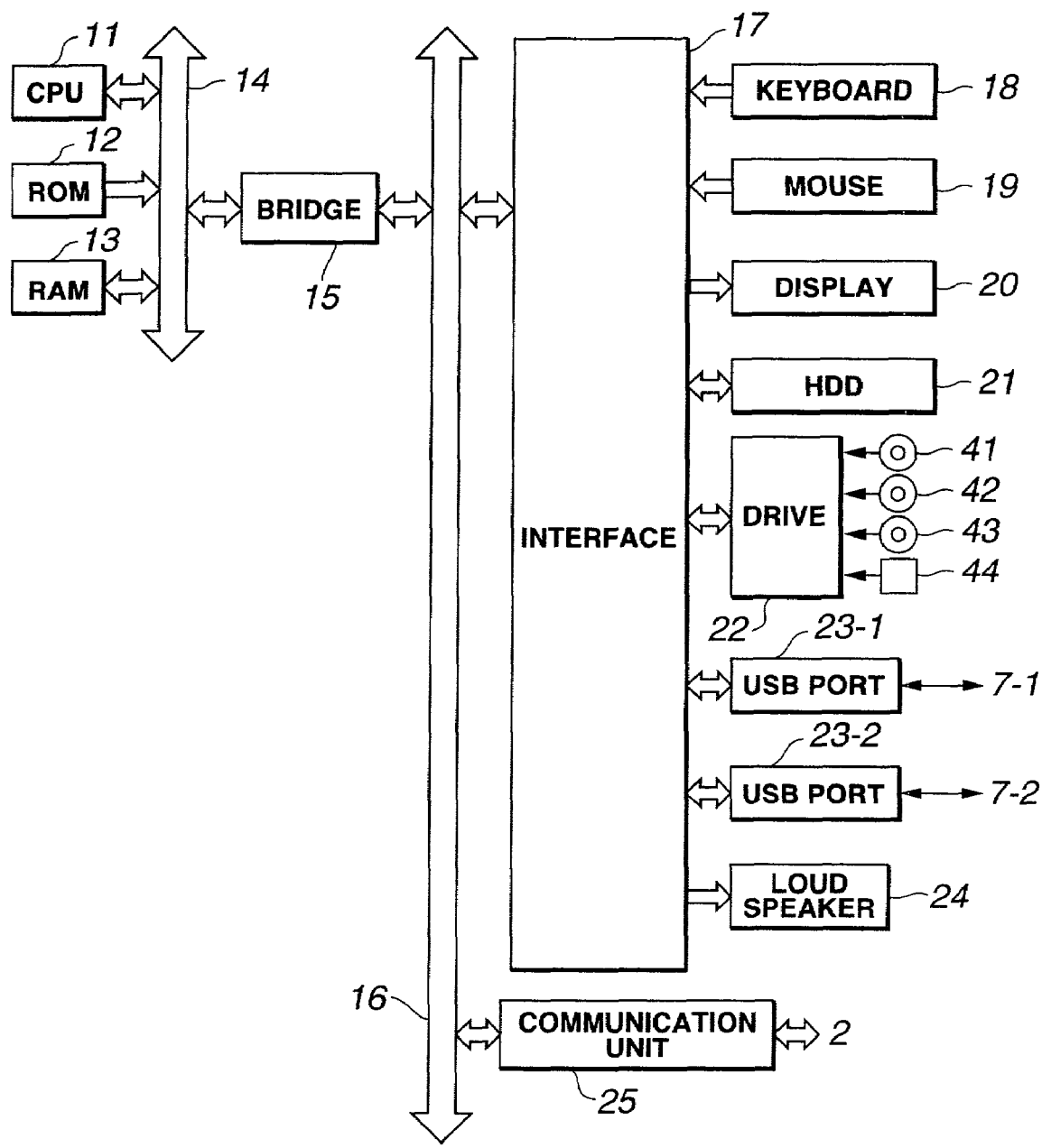
FIG. 2 illustrates the structure of a personal computer.

FIG. 2 illustrates the structure of the personal computer 1. A CPU (central processing unit) 11 actually executes a variety of application programs or operating systems (OS). The application programs will be explained in detail subsequently. A ROM (read-only memory) 12 usually memorizes basically fixed data, among data of the programs used by the CPU 11 and parameters for processing operations. A RAM (random access memory) 13 memorizes the programs used in executing the CPU 11 and parameters incidentally changed in the program execution. These are interconnected over a host bus 14 made up e.g., of a CPU bus.

The host bus 14 is connected through a bridge 15 to an external bus 16, such as a PCI (peripheral component interconnect/interface).

A keyboard 18 is acted upon by the user inputting variable commands to the CPU 11. A mouse 19 is acted on by the user commanding or selecting a point on the screen of the display 20. The display 20 is made up e.g., of a liquid crystal display or a CRT (cathode ray tube) and represents the variable information in text or images. A HDD (hard disc drive) 21 drives a hard disc to record and/or reproduce the program executed by the CPU or the information on or from the hard disc.

A driver 22 reads out data or the program memorized in a magnetic disc 41, an optical disc 42, inclusive of a CD-ROM, a major surface 43 or a semiconductor memory 44, loaded thereon, to route the data or the program through an interface 17, an external bus 16, a bridge 15 and a host bus 14 to a RAM 13 connected in circuit.

To a USB (universal serial bus) port 23-1 is connected the portable device 7-1 over a pre-set cable, not shown. The USB port 23-1 outputs to the portable device 7-1 data furnished from the HDD 21, CPU 11 or the RAM 13 through the interface 17, external bus 16, bridge 15 or the host bus 14, such as data inclusive of contents or commands of the portable device 7-1.

To the USB port 23-2 is connected the portable device 7-2 over a pre-set cable, not shown. The USB port 23-2 outputs to the portable device 7-1 data furnished from the HDD 21, CPU 11 or the RAM 13 through the interface 17, external bus 16, bridge 15 and the host bus 14, such as data inclusive of contents or commands of the portable device 7-2.

A loudspeaker 24 outputs the pre-set speech, corresponding to the contents, based on the data or audio signals supplied from the interface 17.

The components from the keyboard 18 to the loudspeaker 24 are connected to the interface 17, which is connected through the interface 17, external bus 16, bridge 15 and the host bus 14 to the CPU 11.

A communication unit 25, connected to the network 2, stores data furnished from the CPU 11 or the HDD 21, such as registration request, key request or content transmission request, in a packet of a pre-set system, to transmit the packetized data over the network 2, while outputting data stored in the received packet, such as key or contents, to the CPU 11, RAM 13 or to the HDD 21, over the network 2.

The communication unit 25 is connected to the CPU 11 through the external bus 16, bridge 15 and the host bus 14.

Figure 3:
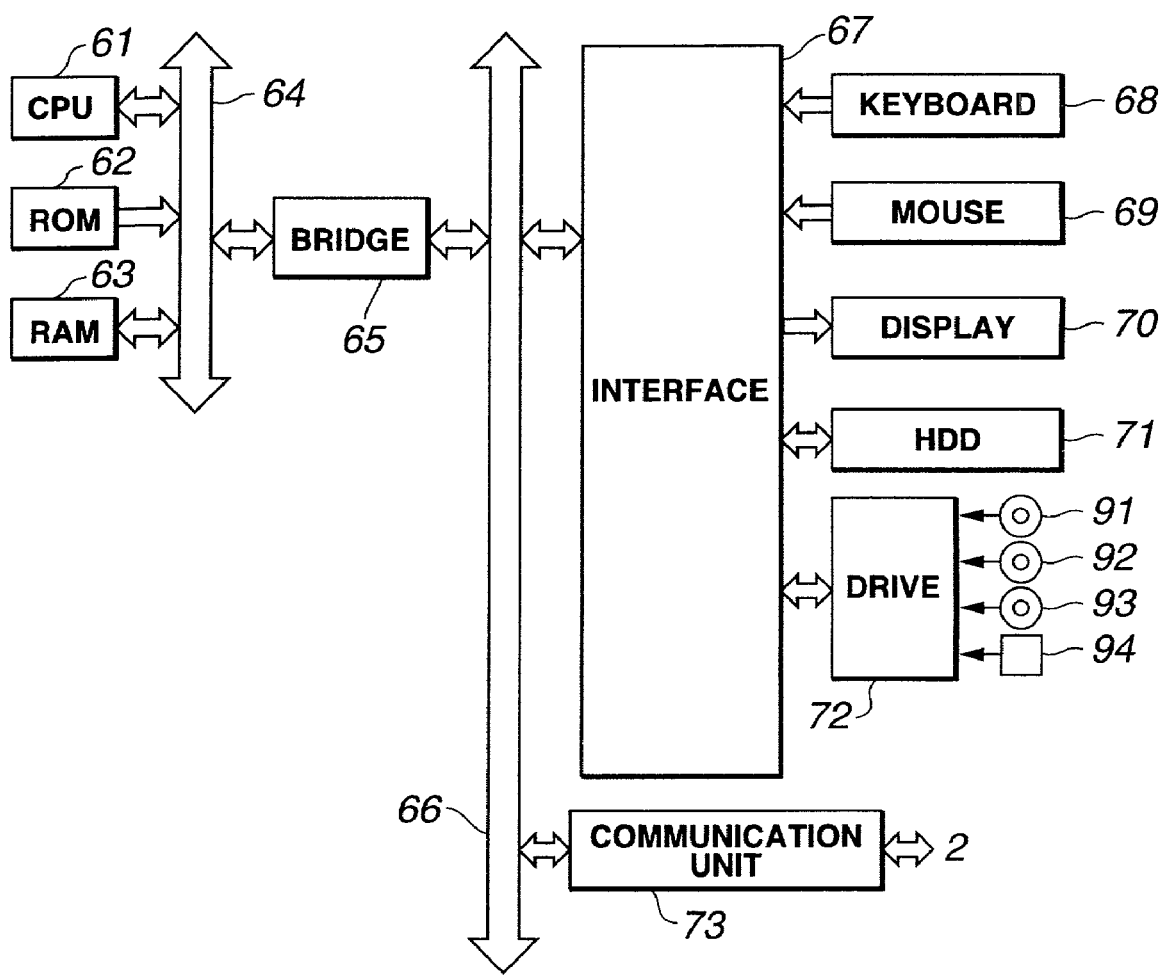
FIG. 3 illustrates the structure of an EMD registration server.

FIG. 3 shows the structure of the EMD registration server 3. A CPU 61 actually executes the application programs, such as the web server program, or the OS. A ROM 62 usually memorizes basically fixed data, among data of the programs used by the CPU 61 and parameters for processing operations. A RAM 63 memorizes the programs used in executing the CPU 61 and parameters incidentally changed in the program execution. These are interconnected over a host bus 64 made up e.g., of a CPU bus.

The host bus 64 is connected through a bridge 65 to an external bus 66, such as a PCI bus.

A keyboard 68 is acted upon by the user inputting variable commands to the CPU 61. A mouse 69 is acted on by the user commanding or selecting a point on the screen of a display 70. The display 70 is made up e.g., of a liquid crystal display or a CRT (cathode ray tube) and demonstrates the variable information in text or images. A HDD (hard disc drive) 71 drives a hard disc to record and/or reproduce the program executed by the CPU or the information on or from the hard disc.

In FIG. 1, the user database 8 and the EMD registration server 3 are shown to be different items. However, if the EMD registration server 3 owns the user database 8 in its inside, the user profile stored in the user database 8 is recorded in the HDD.

A driver 72 reads out data or the program memorized in a magnetic disc 91, an optical disc 92, a magneto-optical disc 93 or a semiconductor memory 94, loaded thereon, to route the data or the program through an interface 67, an external bus 66, a bridge 65 and a host bus 64 to the RAM 63 connected in circuit.

The components from the keyboard 68 to the driver 72 are connected to the interface 67, which is connected through the interface 67, external bus 66, bridge 65 and the host bus 64 to the CPU 61.

A communication unit 73, connected to the network 2, outputs data stored in a received packet, such as data required for registration, as later explained, or an ID (identifier) of a pre-set program, to the CPU 61, RAM 63 or to the HDD 71, over the network 2, while transmitting data from the CPU 61 or the HDD 71 over the network, as the data are stored in a packet of a pre-set system.

The communication unit 73 is connected to the CPU 61 through the external bus 66, bridge 65 and the host bus 64.

The structures of the EMD servers 4-1 to 4-4, key server 5 and the installer server 6 are the same as the structure of the EMD registration server 3 and hence are not explained specifically. There are occasions where key data stored in the key database 9 are recorded on a hard disc of the key server 5.

The functions realized by the personal computer 1 executing the pre-set program are hereinafter explained.

Figure 4:
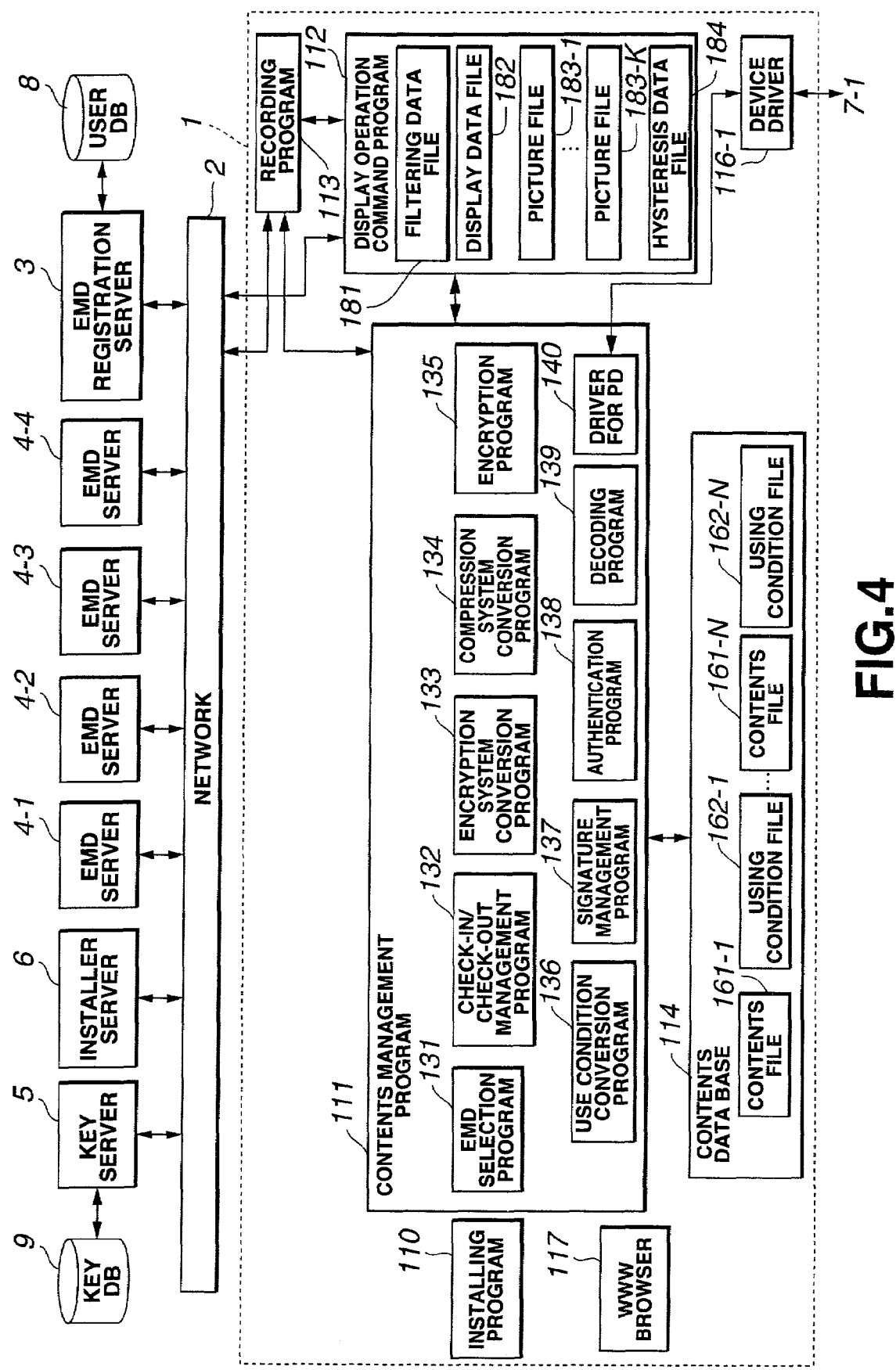
FIG. 4 is a block diagram for illustrating the structure of the functions of the personal computer.

FIG. 4 shows a block diagram for illustrating the structure of the functions of the personal computer 1 when the program is installed form a CD-ROM which is an optical disc 42 furnished in association with the portable device 7-1.

An installing program 110 is read out from a CD-ROM and executed to read out a content management program 111, a display operation command program 112, a recording program 113, a content database 114 and a device driver 116-1, from the CD-ROM, which is an optical disc 42 furnished in association with the portable device 7-1, to install the read-out items in the personal computer 1.

The content management program 111 is made up of plural programs, namely an EMD selection program 131, a check-in/check-out management program 132, an encryption system conversion program 133, a compression system conversion program 134, an encryption program 135, a using condition conversion program 136, a signature management program 137, an authentication program 138, a decoding program 139, and a driver for PD 140.

The content management program 111 is stated with shuffled or encrypted instructions and constructed to hide the processing contents from outside to render the reading of the processing contents difficult, in such a manner that, if the user directly reads out the content management program 111, the instructions cannot be identified.

The EMD selection program 131 selects connection to one of the EMD servers 4-1 to 4-4 to cause a purchasing application program 115-1 or 115-2 as later explained to execute communication with one of the EMD servers 4-1 to 4-4, for example, content downloading in purchasing contents.

Based on the setting of check-in or check-out, and on using condition files 162-1 to 162-N recorded in the content database 114, the check-in/check-out management program 132 checks out contents stored in content files 161-1 to 161-N to one of the portable device 7-1 and the portable device 7-2 or checks-in the contents stored in the portable device 7-1 or 7-2.

Depending on the check-in or check-out processing, the check-in/check-out management program 132 updates using condition data stored in the using condition files 162-1 to 162-N recorded in the content data base 114.

The encryption system conversion program 133 converts the encryption system for contents received by the purchasing application program 115-1 from the EMD server 4-1, the encryption system of contents received by the purchasing application program 115-1 from the EMD server 4-2, the encryption system for contents received by the purchasing application program 115-2 from the EMD server 4-3 and the encryption system of contents received by the purchasing application program 115-2 from the EMD server 4-4, over the network 2, into an encryption system which is the same as that of the contents stored in the content files 161-1 to 161-N recorded on the content data base 114.

Also, in checking out the contents to the portable device 7-1 or 7-2, the encryption system conversion program 133 converts the encryption system of contents to be checked-out into that usable by the portable device 7-1 or 7-2.

The compression system conversion program 134, converts the compression system of contents received by the purchasing application program 115-1 from the EMD server 4-1, the compression system of contents received by the purchasing application program 115-1 from the EMD server 4-2, the compression system of contents received by the purchasing application program 115-2 from the EMD server 4-3, the compression system of contents received by the purchasing application program 115-2 from the EMD server 4-4, over the network 4, into a compression system which is the same as that of the contents stored in the content files 161-1 to 161-N recorded by the content data base 114.

The compression system conversion program 134, is read from e.g., a CD and encodes the non-compressed contents from the recording program 113 in accordance with the same encoding system as that for the contents stored in the content files 161-1 to 161-N recorded in the content data base 114.

Also, when checking out the contents to the portable device 7-1 or 7-2, the compression system conversion program 134, converts the contents to be checked-out into a compression system usable by the portable device 7-1 or 7-2.

The encryption program 135 is read out from e.g., a CD, and encrypts the non-encrypted contents from the recording program 113 in accordance with the same encryption system as that for the contents stored in the content files 161-1 to 161-N recorded in the content data base 114.

The using condition conversion program 136 converts data indicating using conditions of contents received by the purchasing application program 115-1 from the EMD server 4-1, that is a so-called usage rule, data indicating using conditions of contents received by the purchasing application program 115-1 from the EMD server 4-2, data indicating using conditions of contents received by the purchasing application program 115-2 from the EMD server 4-3, or data indicating using conditions of contents received by the purchasing application program 115-2 from the EMD server 4-4, into data of the same format as that of the using condition data stored in the using condition files 162-1 to 162-N recorded in the content data base 114.

Moreover, in checking out the contents to the portable device 7-1 or 7-2, the using condition conversion program 136 converts the using condition data corresponding to the contents to be checked out into using condition data usable by the portable device 7-1 or 7-2.

Before executing the check-in or check-out processing, the signature management program 137 detects falsification of the using condition data based on the signature contained in the using condition data stored in the using condition files 162-1 to 162-N recorded on the content data base 114. The signature management program 137 is responsive to the updating of the using condition data stored in the using condition files 162-1 to 162-N recorded in the content data base 114 to update the signature contained in the using condition data.

The authentication program 138 executes the processing of reciprocal authentication between the content management program 111 and the purchasing application program 115-1 and that between the content management program 111 and the purchasing application program 115-2.

The decoding program 139 decodes the contents when the personal computer 1 reproduces the contents (encrypted contents) stored in the content files 161-1 to 161-N recorded in the content data base 114.

When checking out pre-set contents to the portable device 7-1 or checking in pre-set contents from the portable device 7-1, the driver for PD 140 furnishes to the device driver 116-1 contents or a command for causing the device driver 116-1 to execute pre-set processing.

When checking out pre-set contents to the portable device 7-2 or checking in pre-set contents from the portable device 7-2, the driver for PD 140 furnishes to the device driver 116-2 contents or a command for causing the device driver 116-2 to execute pre-set processing.

Using a filtering data file 181, a display data file 182, picture files 183-1 to 183-K or a hysteresis data file 184, the display operation command program 112 causes a picture of a pre-set window to be demonstrated in a display 20. By actuating a keyboard 18 or a mouse 19, the display operation command program 112 commands execution of the processing such as check-in or check-out to the content management program 111.

The filtering data file 181, having stored therein data for weighting respective contents stored in the content files 161-1 to 161-N recorded in the content data base 114, is recorded on the HDD 21.

The display data file 182, having stored therein data corresponding to respective contents stored in the content files 161-1 to 161-N recorded in the content data base 114, is recorded on the HDD 21.

The picture files 183-1 to 183-K, having stored therein data corresponding to respective contents stored in the content files 161-1 to 161-N recorded in the content data base 114, are recorded on the HDD 21.

If there is no necessity for distinguishing the picture files 183-1 to 183-K from one another, they are simply referred to as picture files 183.

The hysteresis data file 184, having stored therein hysteresis data, such as the number of check-out and check-in of contents stored in the content files 161-1 to 161-N recorded in the content data base 114, is recorded on the HDD 21.

The recording program 113 causes a picture of a pre-set window to be displayed, while causing data such as recording time of contents from a CD as an optical disc 42 loaded on the drive 22 to be read out, based on the actuation of the keyboard 18 or the mouse 19.

Based on e.g., recording time of contents recorded on the CD, the recording program 113 requests a WWW server, not shown, to send data corresponding to the CD, such as album names or artist names, or data corresponding to contents recorded on the CD, such as names of the musical numbers, over the network 2, while receiving data corresponding to the contents recorded on the CD.

The recording program 113 furnishes to the display operation command program 112 received data corresponding to the CD or data corresponding to contents recorded on the CD.

When fed with a recording command, the recording program 113 reads out contents from the CD which is the optical disc 42 loaded on the drive 22 to output the read-out contents to the content management program 111. The content data base 114 stores the contents from the content management program 111, compressed and encrypted in accordance with a pre-set system, to any one of the content files 161-1 to 161-N, by way of recording in the HDD 21. The content data base 114 stores the using condition data corresponding to the contents stored in the content files 161-1 to 161-N in any of the using condition files 162-1 to 162-N corresponding to the content files 161-1 to 161-N, having the contents stored therein, by way of recording in the HDD 21.

It is also possible for the content data base 114 to store the content files 161-1 to 161-N or the using condition files 162-1 to 162-N as records.

For example, the using condition data corresponding to the contents stored in the content file 161-1 are stored in the using condition file 162-1. The using condition data corresponding to the contents stored in the content file 161-N are stored in the using condition file 162-N.

If there is no necessity for distinguishing the content files 161-1 to 161-N from one another, they are simply referred to as contents files 161. If there is no necessity for distinguishing the using condition files 162-1 to 162-N from one another, they are simply referred to as using condition files 162.

A WWW (World Wide Web) browser 117 accesses the EMD registration server 3, over the network 2, based on the URL recorded in a pre-set file, such as a registry, by an installing program 110 to cause a registration form to be displayed, based on the data furnished from the EMD registration server 3, to transmit data of the user profile set on the registration form to the EMD registration server 3.

The WWW browser 117 is not necessarily installed from a CD-ROM furnished in association with the portable device 7-1 or 7-2. For example, the WWW browser 117 may be installed on the personal computer 1, when installing the operating system to the personal computer 1, along with the operating system.

Figure 5:
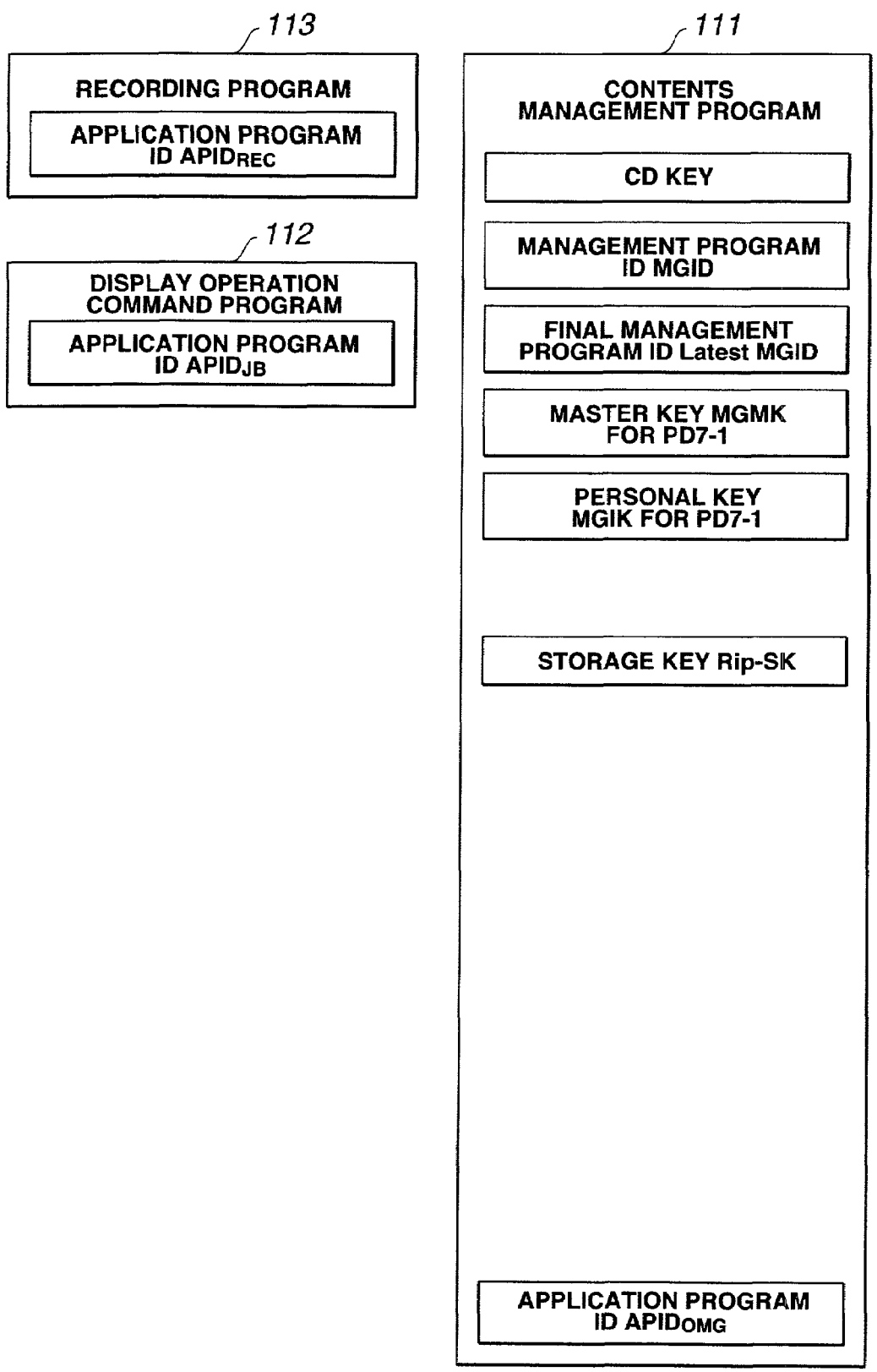
FIG. 5 illustrates an ID or a key saved in association with each program.

An ID (identification) or a key (authentication key or an encryption key) saved in association with each program when installing a program from a CD-ROM which is an optical disc 42 furnished in association with the portable device 7-1 is now explained with reference to FIG. 5.

The CD key is a 20-digit decimal number furnished along with the CD-ROM in association with the portable device 7-1 or the CD-ROM. The CD key is requested to be input before the program is installed by the installing program 110 from the CD-ROM to the personal computer 1. The CD key, input by the user, is stored in a pre-set file recorded on the HDD 21.

When the CD key is input, the installing program 110 reads out a predetermined key set from a key bundle pre-recorded in the CD-ROM to store the read-out key set in a predetermined file recorded in the HDD 21 of the personal computer 1. It is noted that 200,000 key sets are stored in the CD-ROM.

The key set includes MGID as an ID of the content management program 111, a master key MGMK used for authentication processing with the device driver 116-1, a personal key MGIK used for authentication processing with the device driver 116-1, and a storage key Rip-SK used for authentication processing with the content data base 114.

The personal key MGIK may also be generated by the installing program 110 or the content management program 111 by applying a pre-set hash function to the linking of the MFIK and the MGMK. Similarly, the storage key Rip-SK may also be generated by the installing program 110 or the content management program 111 based on the MGID.

If the content management program 111 is installed twice or more, the Latest MGID, which is ID of the last saved content management program 111, is of the same value as the MGID when the program executed by the personal computer 1 for constituting the music data management system is initially installed. That is, when the program is installed from the CD-ROM as the optical disc 42 furnished in association with the portable device 7-1, the Latest MGID is of the same value as the MGID, because the program is not installed from the CD-ROM associated with other portable devices.

The application program ID of the content management program 111, that is $APID_{OMG}$, is made up of codes specifying the types, nation, destination or language of the content management program 111, the bundled portable device 7-1, and so forth.

The application program ID of the recording program 113, that is $APID_{REC}$, is made up of codes specifying the types, nation, destination or language of the recording program 113, the bundled portable device 7-1, and so forth.

The application program ID of the display operation command program 112, that is $APID_{JB}$, is made up of codes specifying the types, nation, destination or language of the display operation command program 112, the bundled portable device 7-1, and so forth.

The structure of the application program ID is hereinafter explained. The application program ID is made up of three-digit decimal number indicating the application type code, three-digit decimal number for the codes of the nation and the destination, three-digit decimal number for the language codes, two-digit decimal number maker codes, one digit decimal number product type code, four-digit decimal number for the bundled product code and a software version code with an unspecified number of digits.

The application type code specifies one of the programs of the content management program 111, display operation command program 112, recording program 113, content data base 114, purchasing application program 115-1, purchasing application program 115-2 and the device driver 116-1.

For example, an application type code, corresponding to the content management program 111, is 001, an application type code, corresponding to the purchasing application program 115-1, is 002 and an application type code, corresponding to the purchasing application program 115-2, is 003.

The nation and the destination codes indicate the nation of sale or distribution of the CD-ROM and the nation of sale of the portable device bundled with the CD-ROM.

For example, if the nation of sale or distribution of the CD-ROM is the United States of America (USA), the nation or destination code is 001, whereas, if the nation of sale or distribution of the CD-ROM is Japan, the nation or destination code is 081.

The language code indicates the language mainly used in a territory of sale or distribution of the CD-ROM, or in a territory of sale of the portable device bundled with the CD-ROM.

For example, if English is mainly used in the territory of sale or distribution of the CD-ROM, the language code is 008, whereas, if Japanese is mainly used in the territory of sale or distribution of the CD-ROM, the language code is 0019.

The maker code denotes a supplier of the CD-ROM. The product type code indicates that the program is furnished without being bundled with the portable device, that the program is furnished without being bundled with the portable device, or that the program is for demonstration purposes.

The bundled product code indicates an equipment bundled with the program, such as a portable device 7-1 or 7-2. However, if the bundled product code is "0000", the program which references to the program ID discounts the bundled product code.

The software version code in an optional number of digits indicates the program version.

The application program ID is recorded on a pre-set file in the HDD 21 along with the data indicating whether or not a key required in content downloading from one of the EMD servers 4-1 to 4-4 has been installed.

For example, directly after the content management program 111 has been installed, a key required in downloading the contents from one of the EMD servers 4-1 to 4-4 is not installed in the application program ID corresponding to the content management program 111. So, the program ID is associated with "false" indicating that the key required in downloading the contents from one of the EMD servers 4-1 to 4-4 is not installed.

After executing the processing of installing a key as later explained, the application program ID associated with the content management program 111 is associated with "true" indicating that the key required in downloading the contents from one of the EMD servers 4-1 to 4-4 has been installed.

The path of the file in which is recorded the application program ID is recorded in another pre-set file, such as a registry.

When the program is installed from the CD-ROM which is the optical disc 42 furnished in association with the portable device 7-1, the personal computer 1 installs a MGID specifying the content management program 111, while recording the key for authentication of the device driver 116-1 of the portable device 7-1.

The personal computer 1 also records the application program ID associated with the program installed in the personal computer 1.

Figure 6:
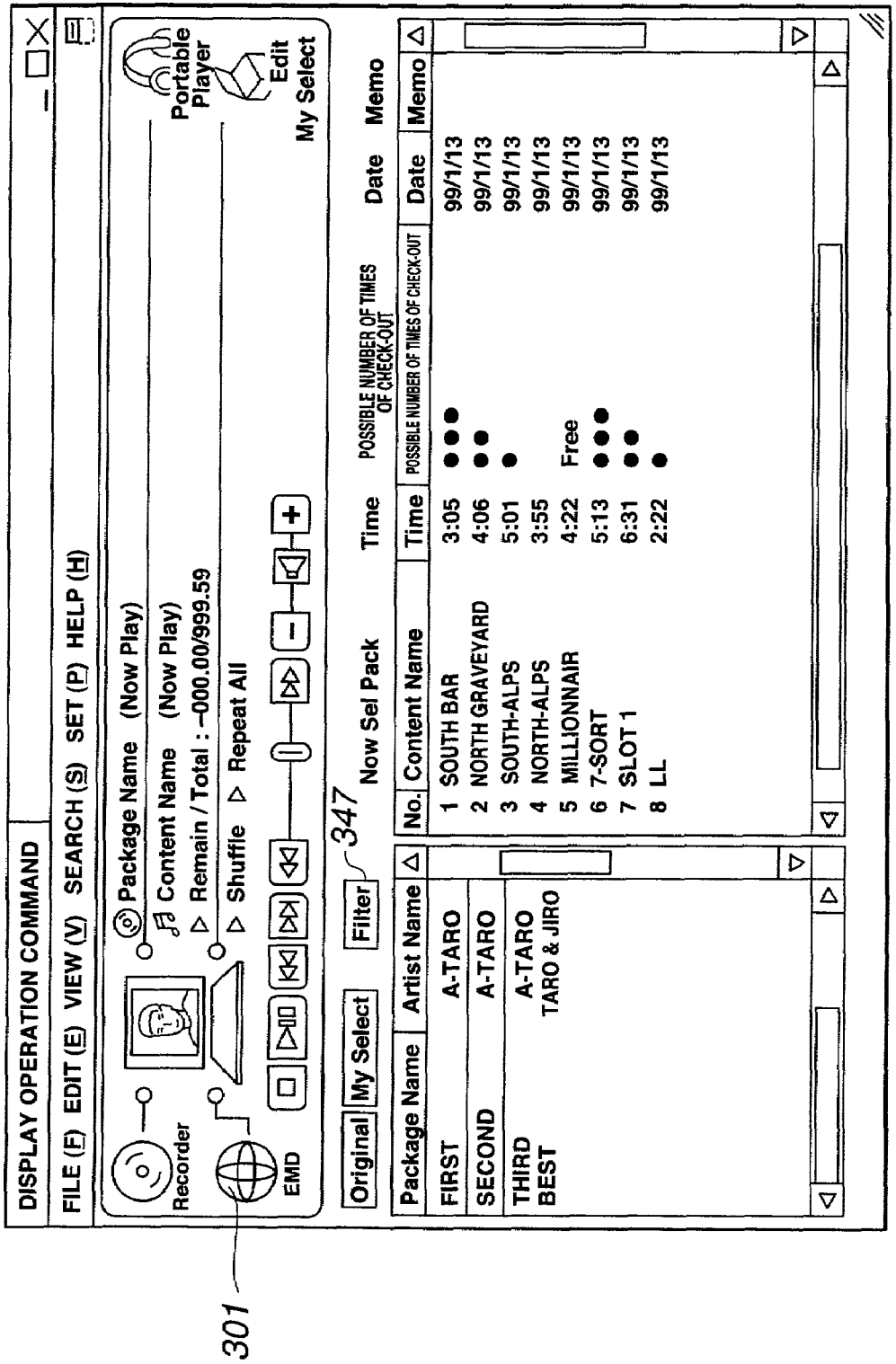
FIG. 6 shows a window in which a display operation command program is to be displayed on a display.

FIG. 6 shows a window the display operation command program 112 demonstrates on the display 20. In the window demonstrated by the display operation command program 112, there is arranged a button 301 for booting the WWW browser 117.

When installing the program from the CD-ROM which is the optical disc 42 furnished in association with the portable device 7-1, the WWW browser 117 is also booted from a shortcut icon, not shown, which the installing program 110 generates on a desktop.

When booted by a button 301 or by double-clicking a shortcut icon, the WWW browser 117, accesses the EMD registration server 3, over the network 2, based on the URL recorded in a pre-set file, such as a registry, by the installing program 110, to demonstrate the registration form furnished by the EMD registration server 3. When accessing the EMD registration server 3, the WWW browser 117 transmits the CD key, MGID, Latest MGID and $APID_{OMG}$ to the EMD registration server 3.

For example, the WWW browser 117 sends the CD key, MGID, Latest MGID and $APID_{OMG}$ as an argument of URL to the EMD registration server 3.

In this case, the WWW browser 117 can set URL to http://regist.openmg.com/server/reg?mbid=xxxx&cdkey=yyyy&latestmgid=zzzz&apid=uuuu. It is noted that xxxx, yyyy, zzzz and uuuu denote the values of MGID, the CD key, Latest MGID and $APID_{OMG}$, respectively.

Figure 7:
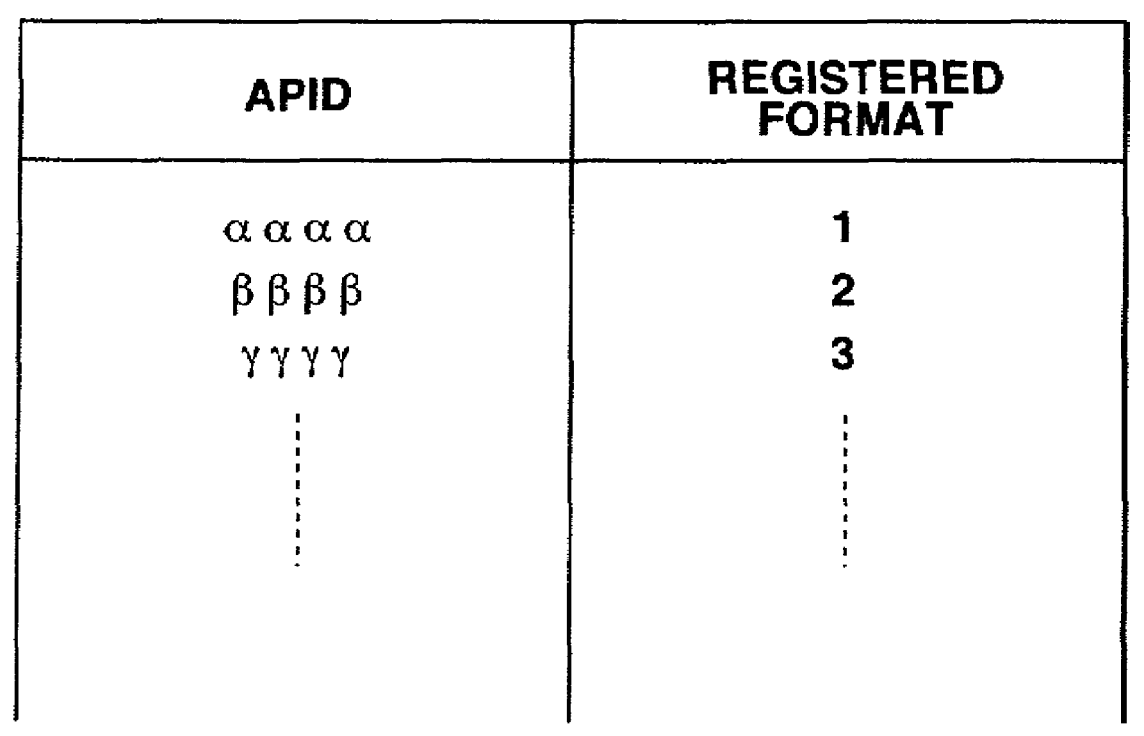

The EMD registration server 3 pre-records the table of correspondence between the application program ID and the registration form at the outset, as shown in FIG. 7. So, based on the received $APID_{OMG}$, the EMD registration server 3 selects data for displaying a pre-set registration form, and transmits data for demonstrating the selected registration form to the personal computer 1.

For example, if the language code of $APID_{OMG}$ corresponds to Japanese, the EMD registration server 3 transmits data for demonstrating the registration form shown in FIG. 8 to the personal computer 1.

If the language code of $APID_{OMG}$ corresponds to English, and the bundle product code corresponds to the portable device 7-1, the EMD registration server 3 transmits data for demonstrating the registration form shown in FIG. 9 to the personal computer 1.

In this manner, the EMD registration server 3 is able to transmit to the personal computer 1 the data for demonstrating the registration form corresponding to the language code stored in the received $APID_{OMG}$ or to the bundled product code.

If, based on the registration form, data on the user profile, such as name or E-mail address, of the user of the personal computer 1, the personal computer 1 transmits the user profile data to the EMD registration server 3.

The EMD registration server 3 causes the user database 8 to retrieve the combination of the pre-recorded MGID and the CD key, which is coincident with the combination of the MGID and the CD key, received from the personal computer 1, to record the user profile data and the $APID_{OMG}$ received from the personal computer 1.

The EMD registration server 3 is able to verify whether or not the user owning the combination of the MGID and the CD key, based on whether or not the user profile data and the $APID_{OMG}$ have been recorded in the user database 8 in association with the combination of the MGID and the CD key.

After recording the user profile data and the $APID_{OMG}$ on the user database 8, the EMD registration server 3 causes the WWW browser 117 of the personal computer 1 to access the installer server 6.

Figure 11:
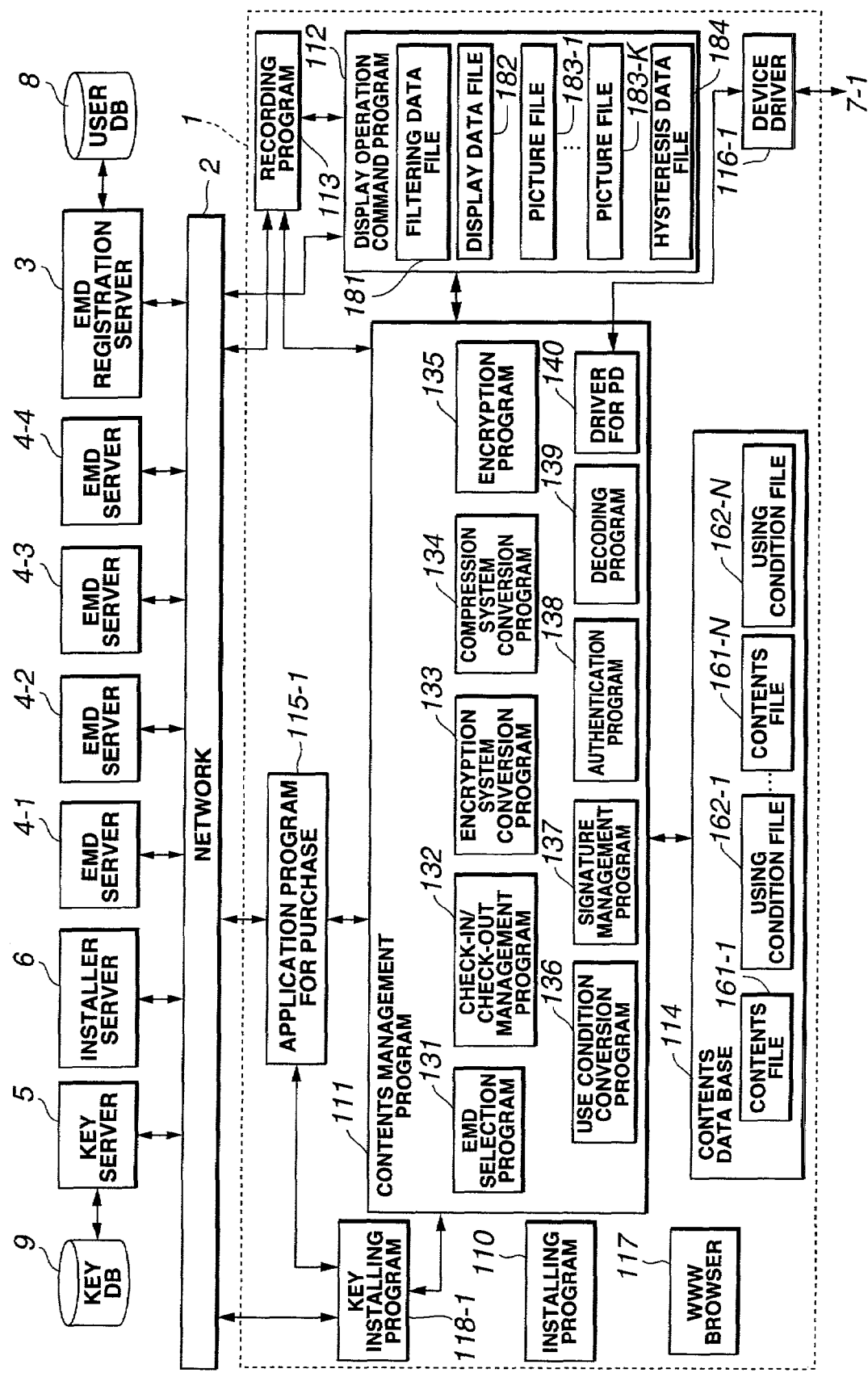
FIG. 11 is a block diagram showing the structure of functions of the personal computer 1.

The installer server 6 causes the WWW browser 117 of the personal computer 1 of the personal computer 1 to download the purchasing application program 115-1 and a key installing program 118-1 associated with the EMD servers 4-1 and 4-2 to install the purchasing application program 115-1 and a key installing program 118-1 downloaded on the personal computer 1, as shown in FIG. 11.

Figure 12:
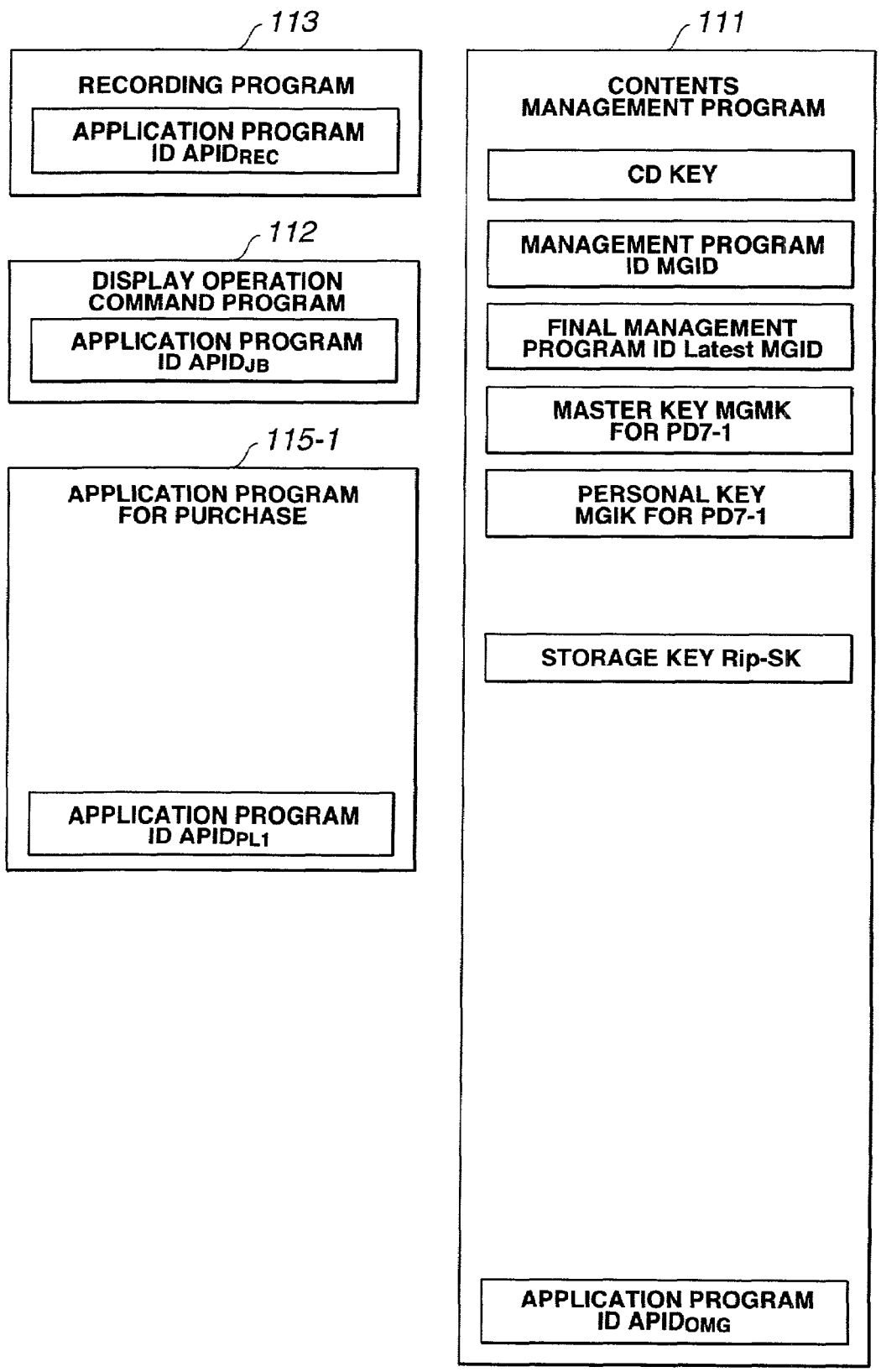
FIG. 12 illustrates an ID or a key saved in association with each program.

When the purchasing application program 115-1 has been installed, the application ID corresponding to the purchasing application program 115-1, referred to below as APID, is saved in a pre-set file of the HDD 21, as shown in FIG. 12.

On booting the key installing program 118-1, the key installing program 118-1 accesses the key server 5, over the network 2, based on the URL previously stored by the key installing program 118-1.

Since "false" indicating that the key necessary for downloading the contents has not been downloaded is associated with the $APID_{OMG}$ and $APID_{PL1}$, the key installing program 118-1 transmits to the key server 5 the $APID_{OMG}$ as the application ID corresponding to the content management program 111, and the $APID_{PL1}$, as the application ID corresponding to the purchasing application program 115-1, along with the MGID and the CD key.

37.

Based on the received MGID and CD key, the key server 5 checks whether or not the user of the personal computer 1 has been registered, by the EMD registration server 3. If it is verified that the user of the personal computer 1 has been registered, the key server 5 causes the key database 9 to generate a key necessary for reciprocal authentication of the purchasing application program 115-1 and the content management program 111 and a key for supervising the contents downloaded from the EMD servers 4-1 to 4-2 to transmit the generated key to the key installing program 118-1.

Based on the $APID_{OMG}$ as the application ID corresponding to the MGID and the content management program 111 and $APID_{PL1}$, as the application ID corresponding to the purchasing application program 115-1, the key database 9 generates inherent keys (keys having values different from those of the other keys) associated with the $APID_{OMG}$ as the application ID corresponding to the MGID and the content management program 111 and $APID_{PL1}$ as the application ID corresponding to the purchasing application program 115-1.

Figure 13:
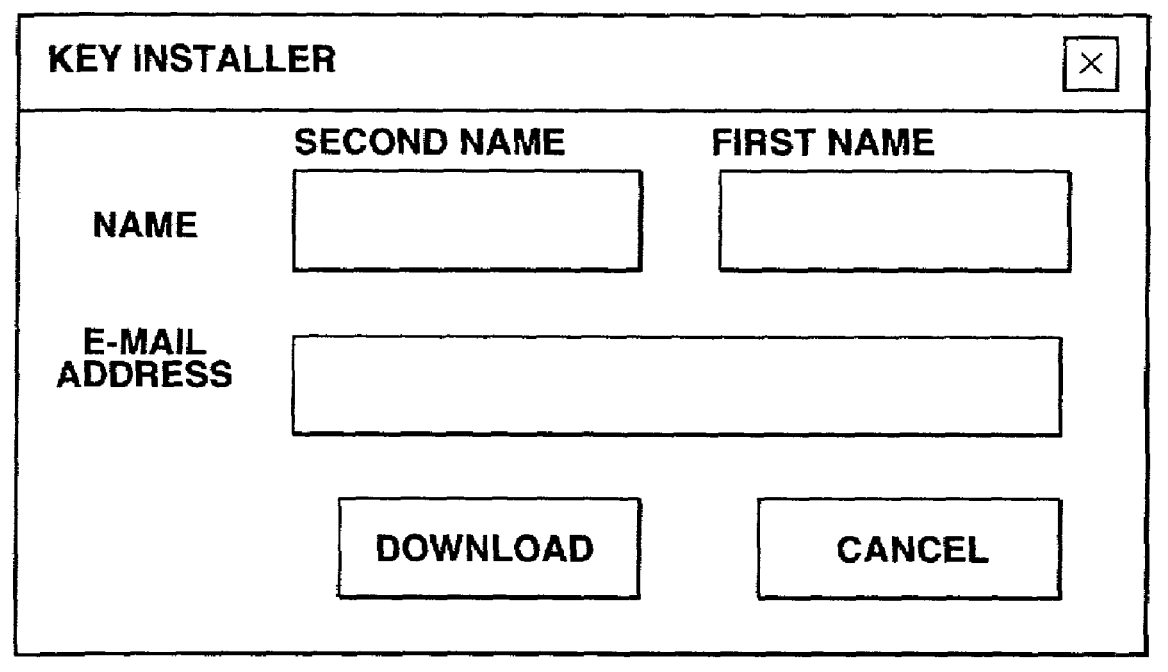

If it is verified that the user of the personal computer 1 has not been registered, the key server 5 transmits data for demonstrating the registration form shown in FIG. 13 to the personal computer 1.

If the user profile is input based on the registration form shown in FIG. 13, the processing is terminated.

If the user profile is input based on the registration form, and the user profile data is transmitted to the key server 5, the key server 5 causes the EMD registration server 3 to register the user profile, while causing the key database 9 to generate the key necessary for reciprocal authentication of the purchasing application program 115-1 and the content management program 111 and the key for supervising the contents downloaded from the EMD servers 4-1 to 4-2 to transmit the generated keys to the key installing program 118-1.

The key installing program 118-1 records the key necessary for reciprocal authentication of the purchasing application program 115-1 and the content management program 111 and the key for supervising the contents downloaded from the EMD servers 4-1 to 4-2.

When the key downloaded from the key server 5 is recorded, the key installing program 118-1 associates $APID_{OMG}$ and $APID_{PL1}$ with "true" indicating that the key necessary for installing the contents have been installed.

Meanwhile, the key necessary for reciprocal authentication of the purchasing application program 115-1 an the content management program 111 and the key for supervising the contents downloaded from the EMD servers 4-1 to 4-2 are stored in a pre-set certificate along with the signature.

Figure 14:
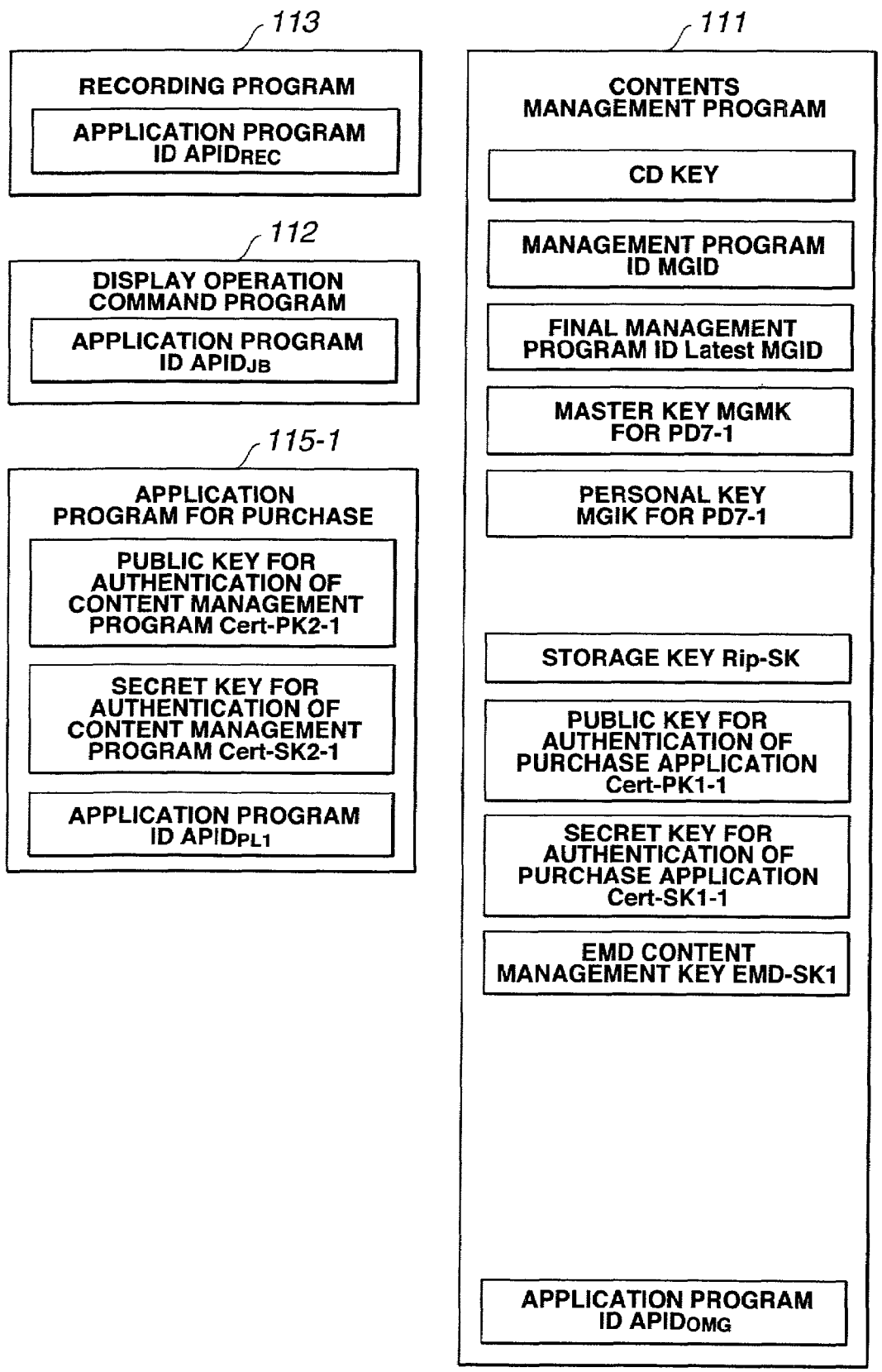
FIG. 14 illustrates an ID or a key saved in association with each program.

FIG. 14 illustrates the key necessary for reciprocal authentication of the purchasing application program 115-1 and the content management program 111, received from the key server 5 and recorded, and the key for supervising the contents downloaded from the EMD servers 4-1 to 4-2.

The public key for authenticating the application for purchase Cert-PK1-1 is a key used by the content management program 111 in the processing for authenticating the purchasing application program 115-1. The secret key for authenticating the application for purchase Cert-SK1-1 is a key used by the content management program 111 in the processing for authenticating the purchasing application program 115-1.

In employing the key which is based on an elliptical curve cipher, an element P of a point p on an elliptical curve EC(p) is generated, and the public key for authenticating the application for purchase Cert-PK1-1 as well as the secret key for authenticating the application for purchase Cert-SK1-1 are found.

The EMD content management key EMD-SK1 is a key for supervising the contents downloaded from the EMD servers 4-1 to 4-2. Of course, the key for managing the contents downloaded from the EMD server 4-1 may be distinct from the key for managing the contents downloaded from the EMD server 4-2.

The public key for authenticating the application for purchase Cert-PK2-1 is a key used by the purchasing application program 115-1 in the processing in authenticating the content management program 111. The secret key for authenticating the content management program Cert-SK2-1 is a key used by the purchasing application program 115-1 in the processing for authenticating the content management program 111.

The key used in reciprocal authentication of the purchasing application program 115-1 and the content management program 111 and the key for managing the contents downloaded from the EMD servers 4-1 to 4-2 are inherent keys associated with the purchasing application program 115-1 and the content management program 111 supplied from the key server 5.

After receiving the key used in reciprocal authentication of the purchasing application program 115-1 and the content management program 111, and the key for supervising the contents downloaded from the EMD servers 4-1 to 4-2, the key installing program 118-1 transmits to the key server 5 the MGID and the $APID_{OMG}$ as the application ID corresponding to the content management program 111. The key server 5 retrieves the pre-recorded table, based on the received $APID_{OMG}$, to transmit the corresponding URL to the key installing program 118-1. The previously stored table shown in FIG. 15 records the pre-set URL in association with the language code and the bundled product code of $APID_{OMG}$. For example, if the language code of $APID_{OMG}$ corresponds to Japanese, and the bundled product code corresponds to the portable device 7-1, the key server 5 transmits the URL associated with the EMD server, such as the EMD server 4-1, demonstrating the page described in Japanese, to the personal computer 1.

If the language code corresponds to English, and the bundled product code corresponds to the portable device 7-1, the key server 5 transmits the URL associated with the EMD server, such as the EMD server 4-2, for demonstrating the page described in English, to the personal computer 1.

Moreover, if, for example, the language code of $APID_{OMG}$ corresponds to Japanese, and the bundled product code corresponds to the portable device 7-2, the key server 5 transmits the URL associated with the EMD server, such as the EMD server 4-3, demonstrating the page described in Japanese, to the personal computer 1.

If the language code corresponds to English, and the bundled product code corresponds to the portable device 7-2, the key server 5 transmits the URL associated with the EMD server, such as the EMD server 4-4, for demonstrating the page described in English, to the personal computer 1.

On receipt of the URL from the key server 5, the key installing program 118-1 records the URL in a pre-set file, such as a registry.

When subsequently the button 301 is clicked, the WWW browser 117 accesses one of the EMD servers 4-1 to 4-4, adapted to the portable device 7-1 or 7-2 and to the language of the user, based on the URL supplied to the key server 5.

Figure 16:
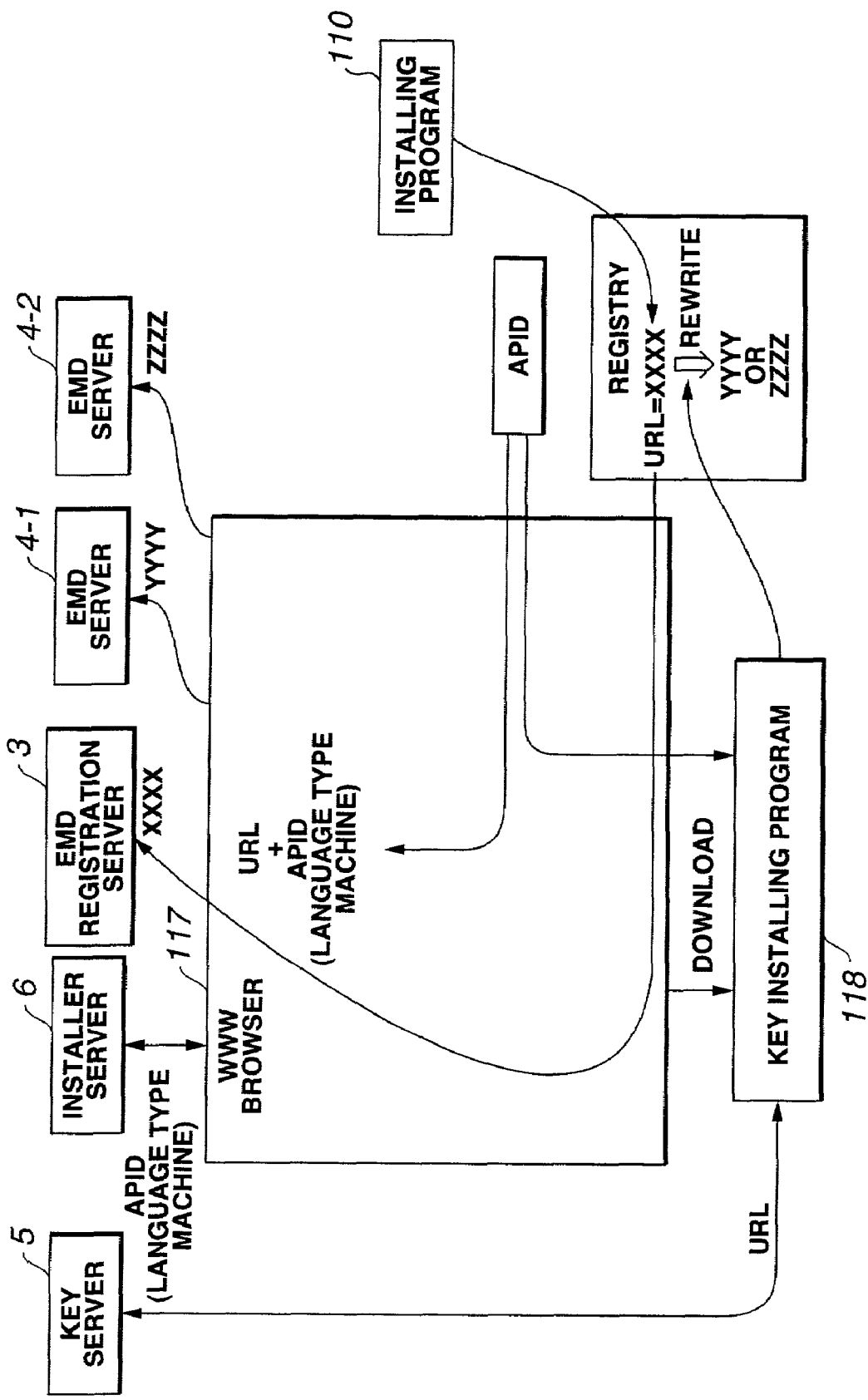
FIG. 16 illustrates schematics of the processing for rewriting the URL.

The schematics of the processing for rewriting the URL, as a reference of accessing of the WWW browser 117, are explained with reference to FIG. 16.

The installing program 110 first sets the URL associated with the EMD registration server 3. When booted, the WWW browser 117 accesses the EMD registration server 3 based on the so-set URL.

Since the APID is delivered to the EMD registration server 3, as an argument of URL, the EMD registration server 3 is able to furnish data of the registration form, corresponding to the language of the user of the portable device and to the type of the portable device, such as one of the portable devices 7-1 and 7-2.

After the end of the processing for registration, the WWW browser 117 accesses the installer server 6, based on the URL, not recorded in the registry, furnished to the EMD registration server 3, and downloads the key installing program 118 to install the key installing program 118 on the personal computer 1.

After the end of the processing for key downloading, the key installing program 118 sends the APID to the key server 5. Since the APID is associated with the type of the portable device, such as the portable device 7-1 or 7-2, and with the language of the portable device user, the key server 5 is able to furnish the URL associated with one of the EMD servers 4-1 to 4-4, corresponding to the portable device type and the language of the user, to the key installing program 118, which key installing program rewrites the URL, recorded on the registry, to the URL associated with one of the EMD servers 4-1 to 4-4.

The WWW browser 117, booted subsequently, accesses one of the EMD servers 4-1 to 4-4, adapted to the portable device type and the language of the user, based on the URL associated with one of the EMD servers 4-1 to 4-4.

In this manner, the user is able to access one of the EMD servers 4-1 to 4-4, adapted to the language of the user and to the portable device 7-1 or 7-2, without doing laborious operations, such as URL setting.

Figure 17:
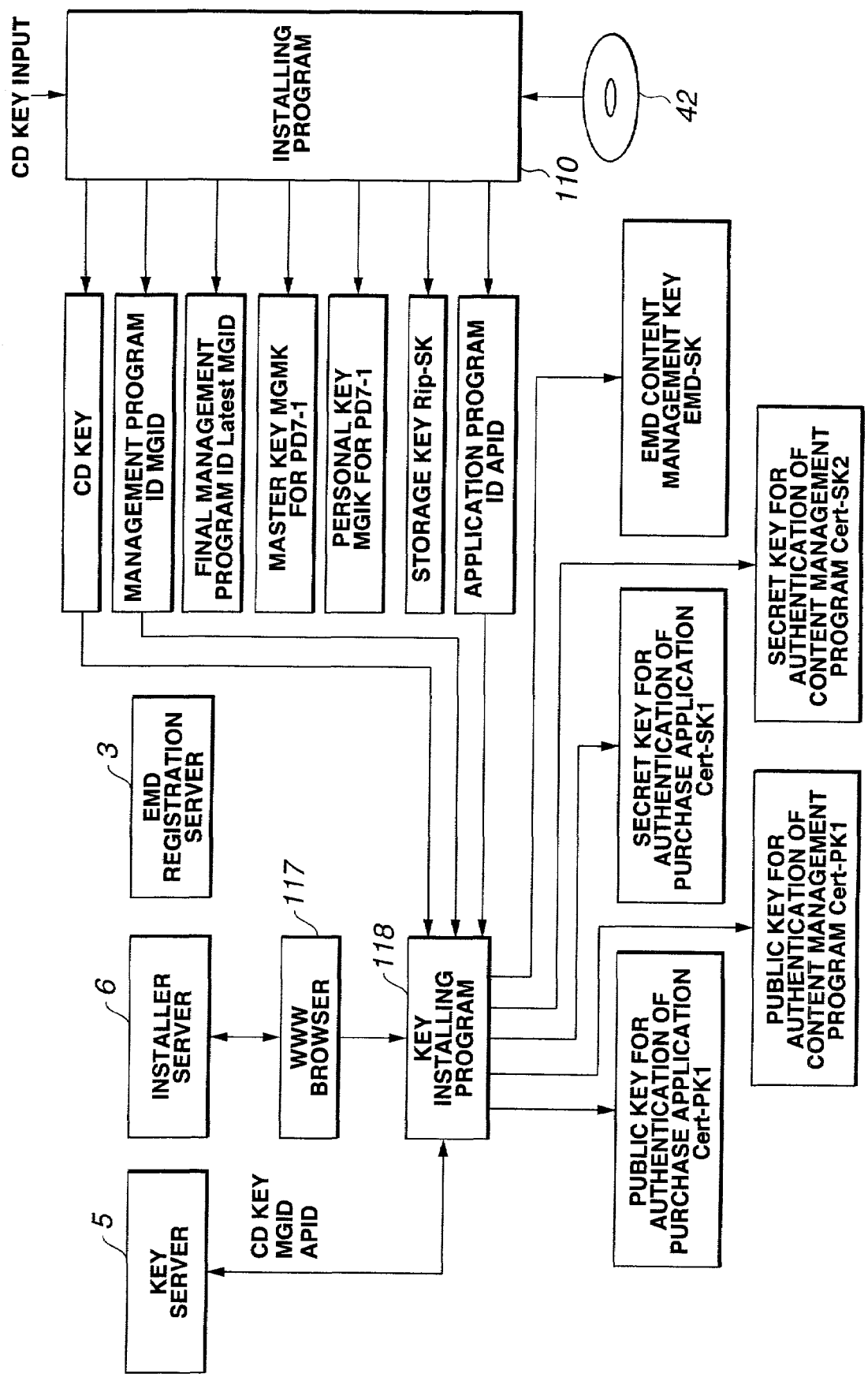
FIG. 17 illustrates schematics of the processing for installing a key.

The schematics of the key installing processing is explained with reference to FIG. 17. When the CD key is input, the installing program 110 reads out a key set, made up of the MGID, as an ID of the content management program 111, master key MGMK, a personal key MGIK and the storage key Rip-SK, from the key bundle pre-recorded in the CD-ROM, based on the CD key, to record the read-out key set in a pre-set file of the HDD 21 of the personal computer 1, along with the CD key. When installing for the first time, the installing program 110 sets a value of the MGID in the Latest MGI, which is the final management program ID. When installing for the second time etc., the installing program 110 updates the Latest MGID as the last management program.

When installing for the second time etc., the installing program 110 does not update the MGID or the CD key, recorded in the personal computer 1.

When installing for the second time etc., the installing program 110 updates the application program ID of the content management program 111, that is the $APID_{OMG}$.

The key installing program 118, downloaded by the WWW browser 117 from the installer server 6 and installed, transmits the CD key, MGID and the APID to the key server 5, while receiving the public key for authenticating the application for purchase Cert-PK1-1, the secret key for authenticating the application for purchase Cert-SK1-1, EMD contents management key EMD-SK, public key for authenticating the application for purchase Cert-PK2-1 and the secret key for authenticating the content management program Cert-SK2-1 from the key server 5.

In this manner, the personal computer 1 is able to acquire a inherent key used for reciprocal authentication of the purchasing application program 115-1 and the content management program 111 and a inherent key for management of the contents downloaded from the EMD servers 4-1 to 4-4. Since the key installing program 118 is stored in the inside and is invisible from outside, it is possible with the URL of the key server 5 to prevent illicit acquisition of the key used for reciprocal authentication of the purchasing application program 115-1 and the content management program 111 or the key for management of the contents downloaded from the EMD servers 4-1 to 4-4.

Figure 18:
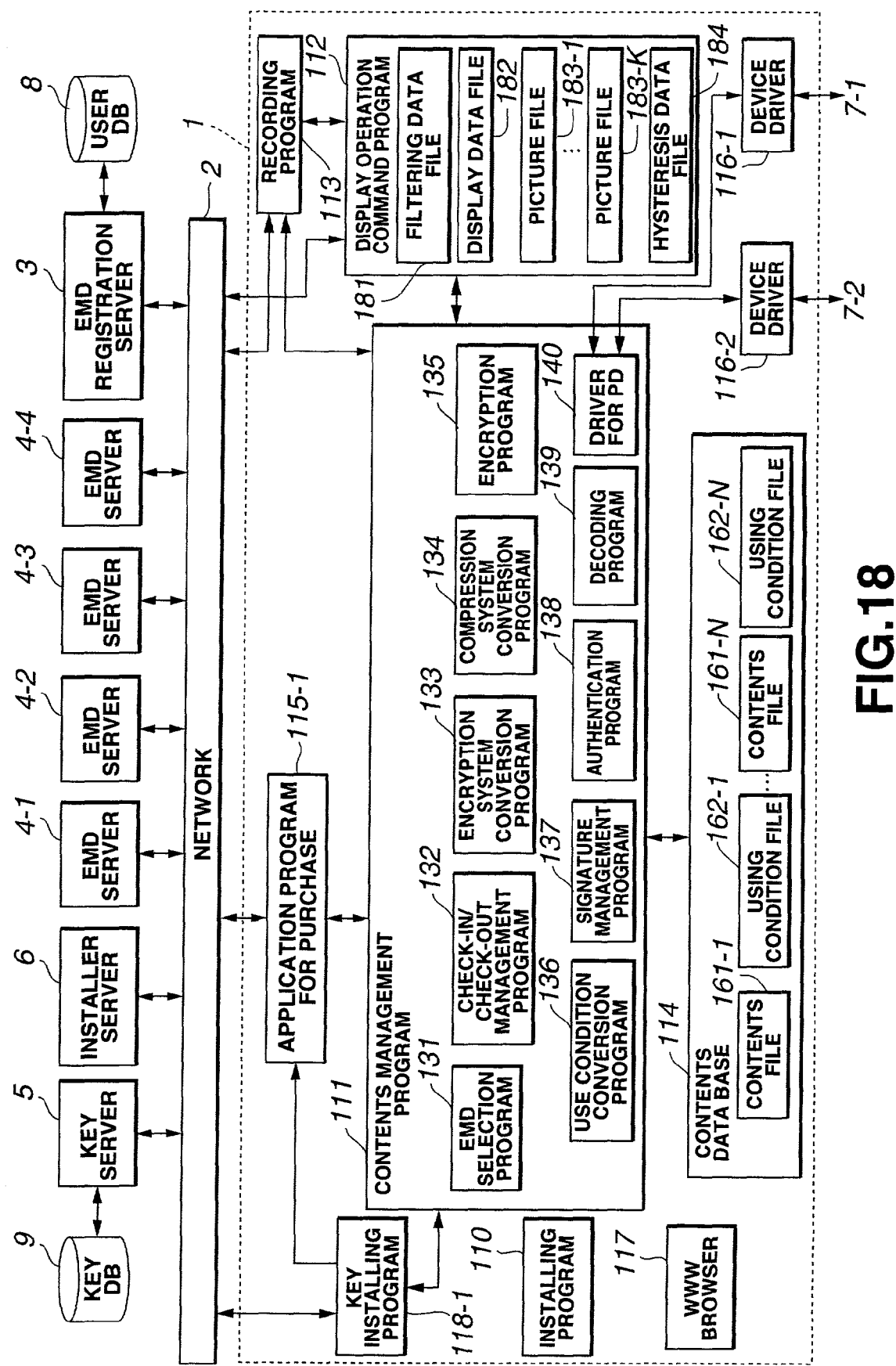
FIG. 18 is a block diagram for illustrating the structure of a function of the personal computer.
Figure 19:
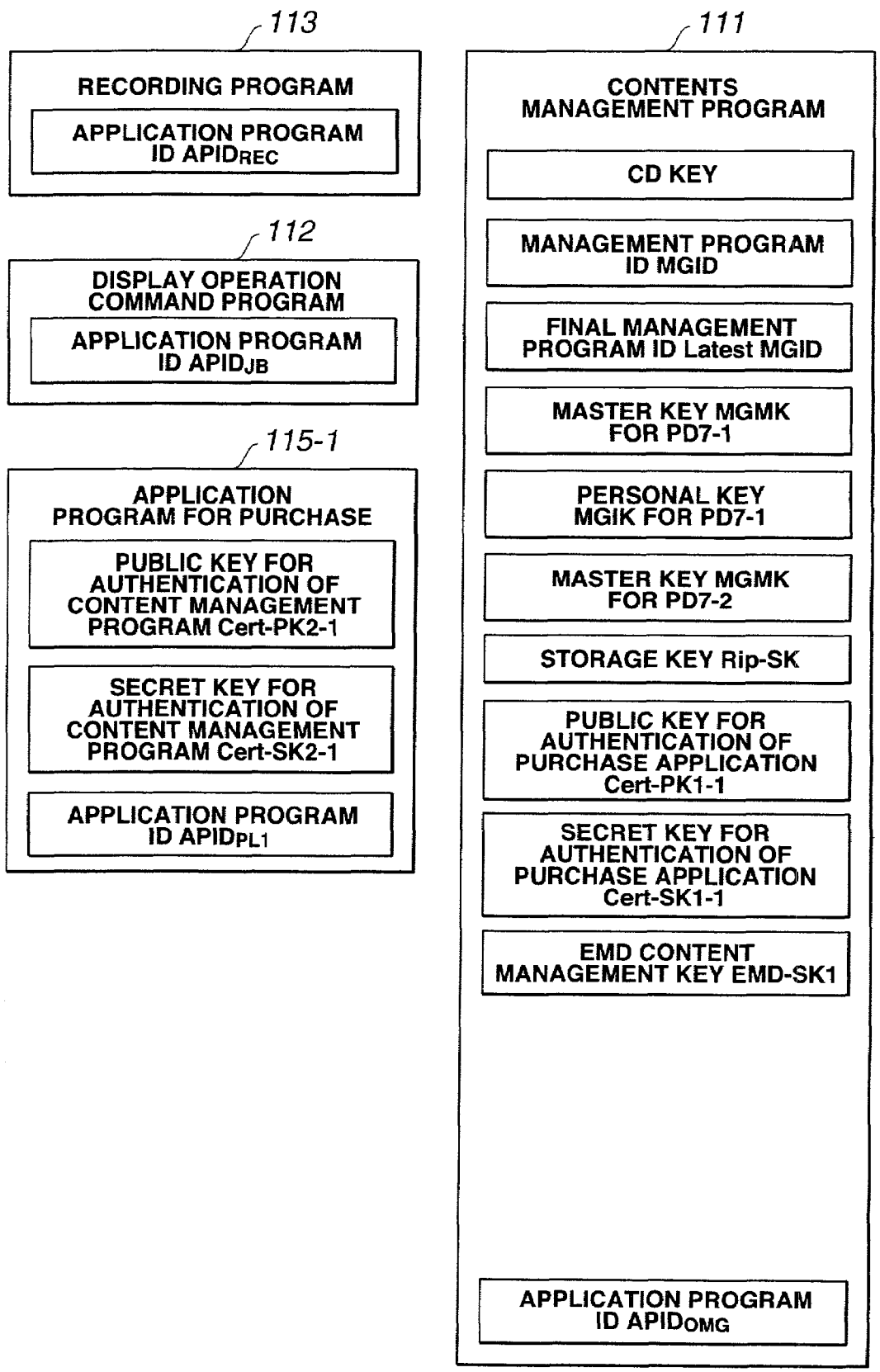
FIG. 19 illustrates the ID or the key saved in association with each program.

FIG. 18 is a block diagram for illustrating the structure of the function of the personal computer 1 when the program is installed, from the state explained above with reference to FIGS. 11 and 14, from the CD-ROM which is the optical disc 42 furnished in association with the portable device 7-2.

The installing program 110 reads out the content management program 111 and the device driver 116-2 from the CD-ROM which is the optical disc 42 furnished in association with the portable device 7-2 to install the program and the driver on the personal computer 1. The content management program 111 is overwritten.

The installing program 110 associates the $APID_{OMG}$, as an application ID associated with the content management program 111, with "false" indicating that the key necessary for downloading the program has not been installed.

When fed with the CD key, having a value different from the CD key installed from the CD-ROM, which is the optical disc 42 furnished in association with; the portable device 7-1, the installing program 110 reads out a predetermined key set from the key bundle previously recorded on the CD-ROM, to store the read-out key set in a predetermined file recorded on the HDD 21 of the personal computer 1.

The MGID, which is the ID of the content management program 111 included in the key set, is set in the Latest MGID. The CD key, MGID, master key MGMK, personal key MGIK, storage key Rip-SK, public key for authenticating the application for purchase Cert-PK1-1, secret key for authenticating the application for purchase Cert-SK1-1, EMD contents management key EMD-SK1, public key for authenticating the application for purchase Cert-PK2-1 or the secret key for authenticating the content management program Cert-SK2-1, already recorded, is not updated.

The master key VMCMK, used for authentication processing of the device driver 116-2, and which is included in the key set, is added to the predetermined file.

When booted on double-clicking the button 301 or the shortcut icon, the WWW browser 117 accesses the EMD registration server 3 to display the registration form furnished by the EMD registration server 3, based on the URL recorded on a pre-set file, such as a registry, over the network 2, by the installing program 110, to cause the registration form supplied by the EMD registration server 3 to be demonstrated. When accessing the EMD registration server 3, the WWW browser 117 transmits the CD key, MGID, Latest MGID and $APID_{OMG}$ to the EMD registration server 3. For example, the WWW browser 117 transmits the CD key, MGID, Latest MGID and $APID_{OMG}$, as an argument of the URL, to the EMD registration server 3.

For example, if the language code of the $APID_{OMG}$ is associated with English and the bundled product code is associated with the portable device 7-2, the EMD registration server 3 transmits data demonstrated on the registration form shown in FIG. 20 to the personal computer 1. It is noted that the registration form shown in FIG. 20 differs from that shown in FIG. 9.

If fed with data of the profile of the user of the personal computer 1, such as name or E-mail address, based on the registration form shown in FIG. 20, the personal computer 1 transmits the user profile to the EMD registration server 3.

Figure 21:
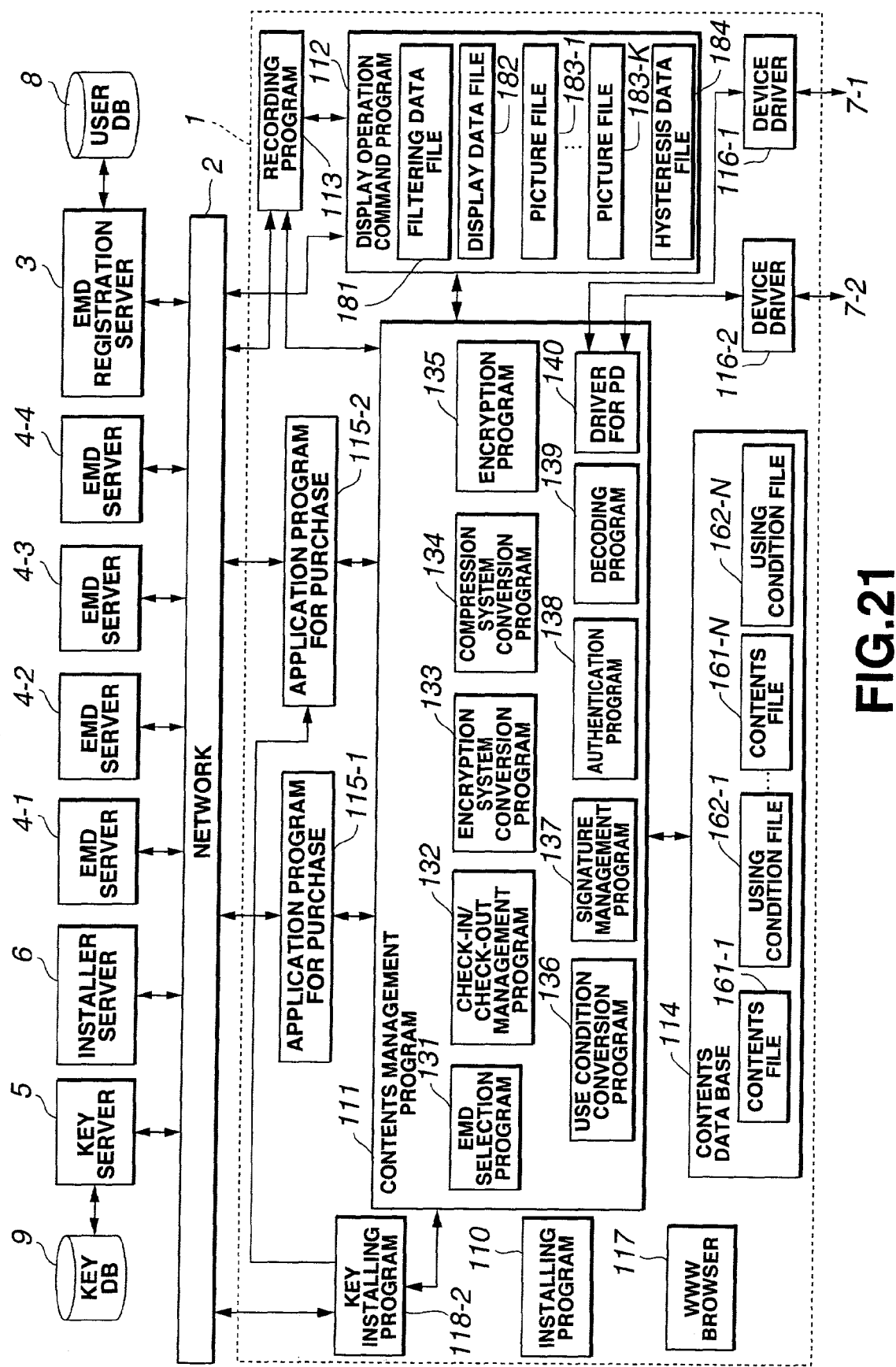
FIG. 21 is a block diagram for illustrating the structure of a function of the personal computer.
Figure 22:
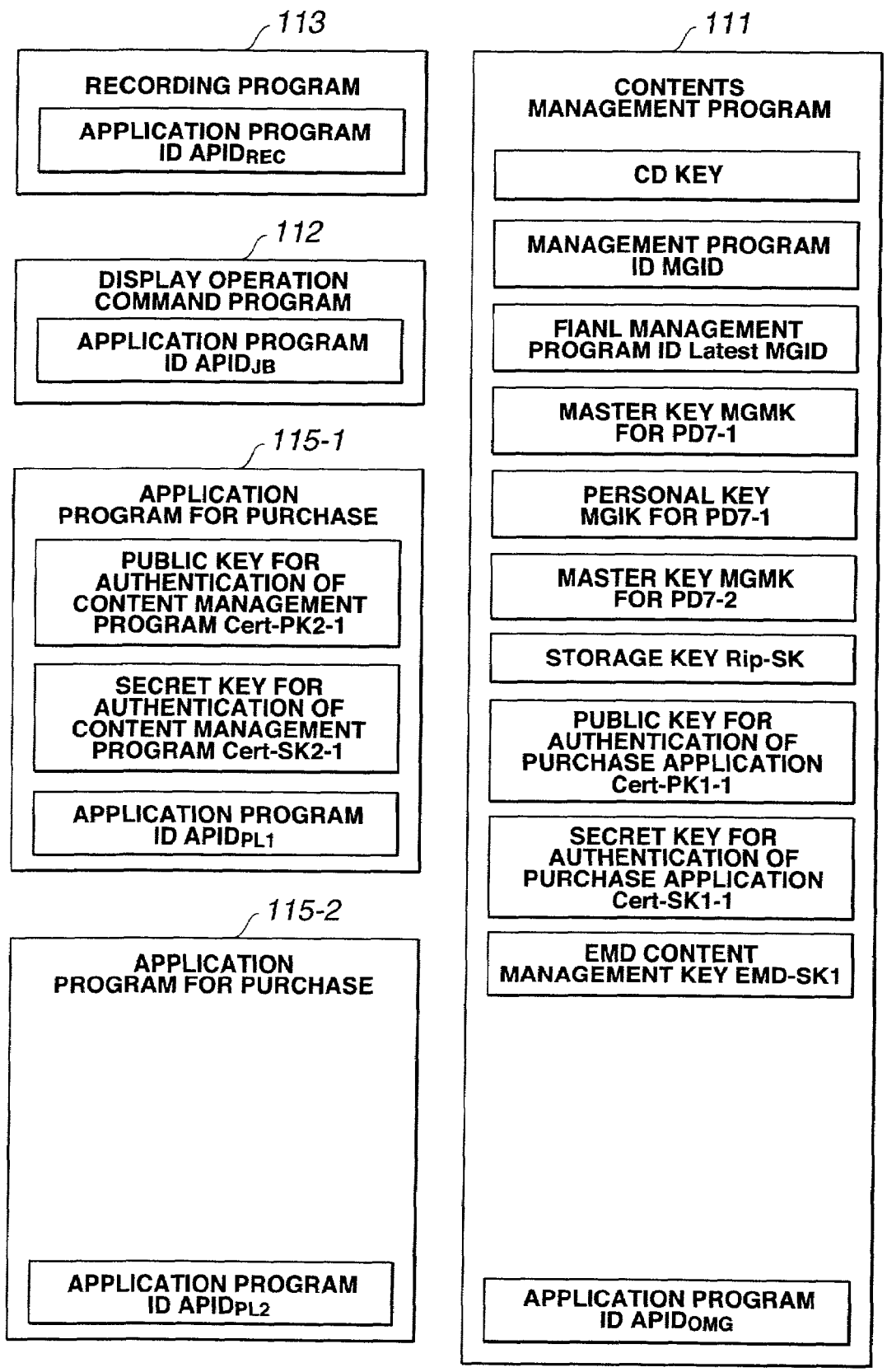
FIG. 22 illustrates the ID or the key saved in association with each program.

After recording the user profile data and the $APID_{OMG}$, the EMD registration server 3 causes the WWW browser 117 of the personal computer 1 to access the installer server 6. Referring to FIG. 21, the installer server 6 causes the WWW browser 117 of the personal computer 1 to download the purchasing application program 115-2 and the key installing program 118-2, associated with the EMD servers 4-3 and 4-4, respectively, over the network 2, to install the downloaded purchasing application program 115-2 an the key installing program 118-2 on the personal computer 1.

When the purchasing application program 115-2 has been installed, the $APID_{PL2}$, as an application ID associated with the purchasing application program 115-2, is saved in a pre-set file of the HDD 21. The $APID_{PL2}$ is associated with "false" indicating that the key necessary for downloading the contents has not been installed.

When then booted, the key installing program 118-2 accesses the key server 5, overt the network 2, based on the URL previously stored in the key installing program 118-2.

Since the $APID_{OMG}$ and the $APID_{PL2}$ are associated with "false" indicating that the key necessary for downloading the contents has not been installed, the key installing program 118-2 transmits to the key server 5 the $APID_{OMG}$, as an application ID associated with the content management program 111, and the $APID_{PL2}$, as an application ID associated with the purchasing application program 115-2, along with the MGID and the CD key.

If, as a result of checking whether or not the user of the personal computer 1 has been registered, based on the received MGID and the CD key, it is verified that the user of the personal computer 1 has not been registered, the key server 5 requests the key database 9 to generate a key necessary for reciprocal authentication of the purchasing application program 115-2 and the content management program 111 and a key for managing the contents downloaded from the EMD servers 4-3 and 4-4.

Based on the MGID, $APID_{OMG}$, as an application ID associated with the content management program 111, and the $APID_{PL2}$, as an application ID associated with the purchasing application program 115-2, the key database 9 generates inherent keys associated with MGID, $APID_{OMG}$, as an application ID associated with the content management program 111, and the $APID_{PL2}$, as an application ID associated with the purchasing application program 115-2. It is noted that the inherent key differs from that for the $APID_{PL2}$.

The key server 5 transmits the generated key to the key installing program 118-2.

The key installing program 118-2 records the key necessary for reciprocal authentication of the purchasing application program 115-2 and the content management program 111, and the key for managing the contents downloaded from the EMD servers 4-3 and 4-4, received from the key server 5, in a pre-set file of the HDD 21.

Meanwhile, the key necessary for reciprocal authentication of the purchasing application program 115-2 and the content management program 111, and the key for managing the contents downloaded from the EMD servers 4-3 and 4-4, are transmitted as these keys are stored with a signature in a predetermined certificate.

Figure 23:
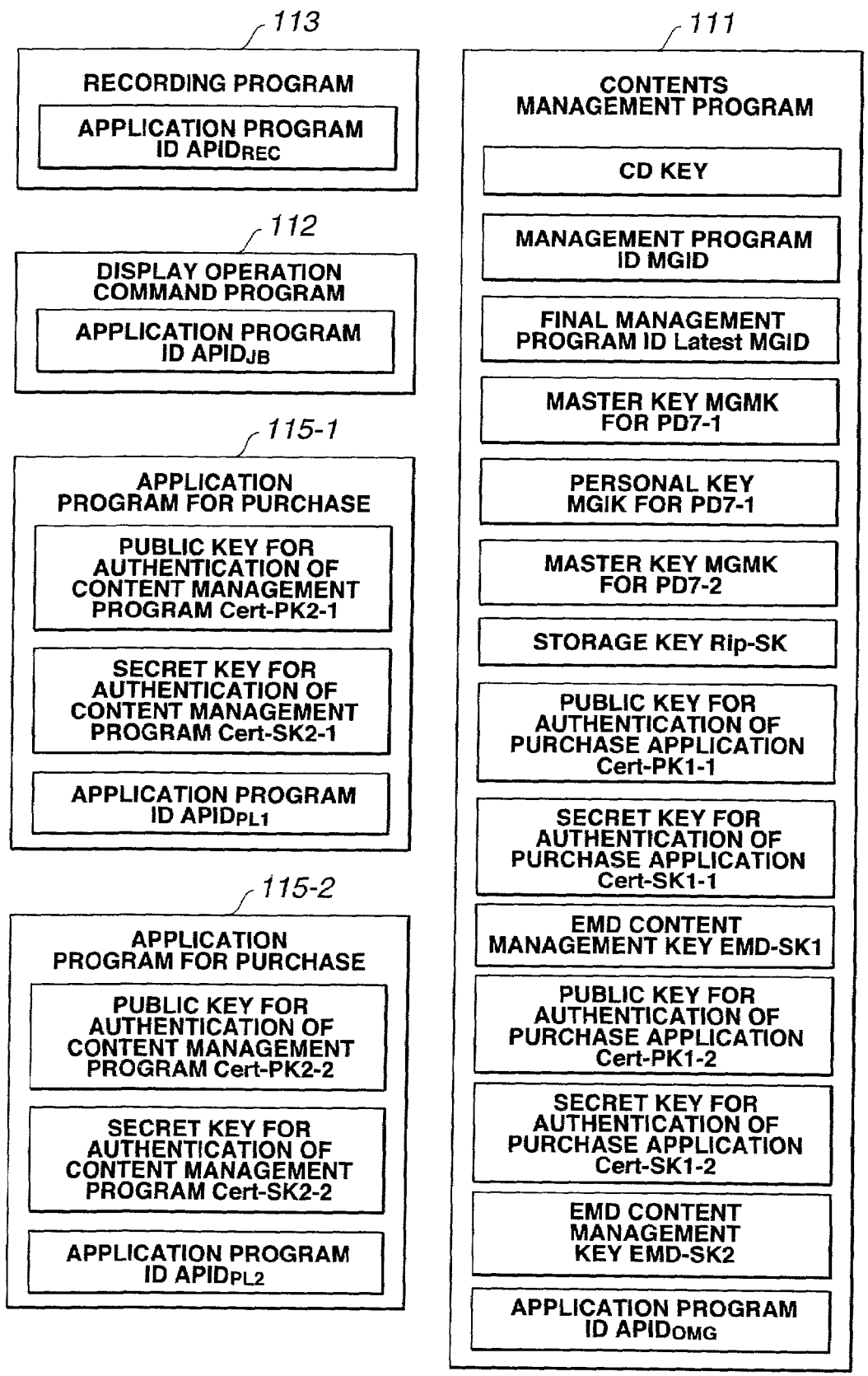
FIG. 23 illustrates the ID or the key saved in association with each program.
Figure 24:
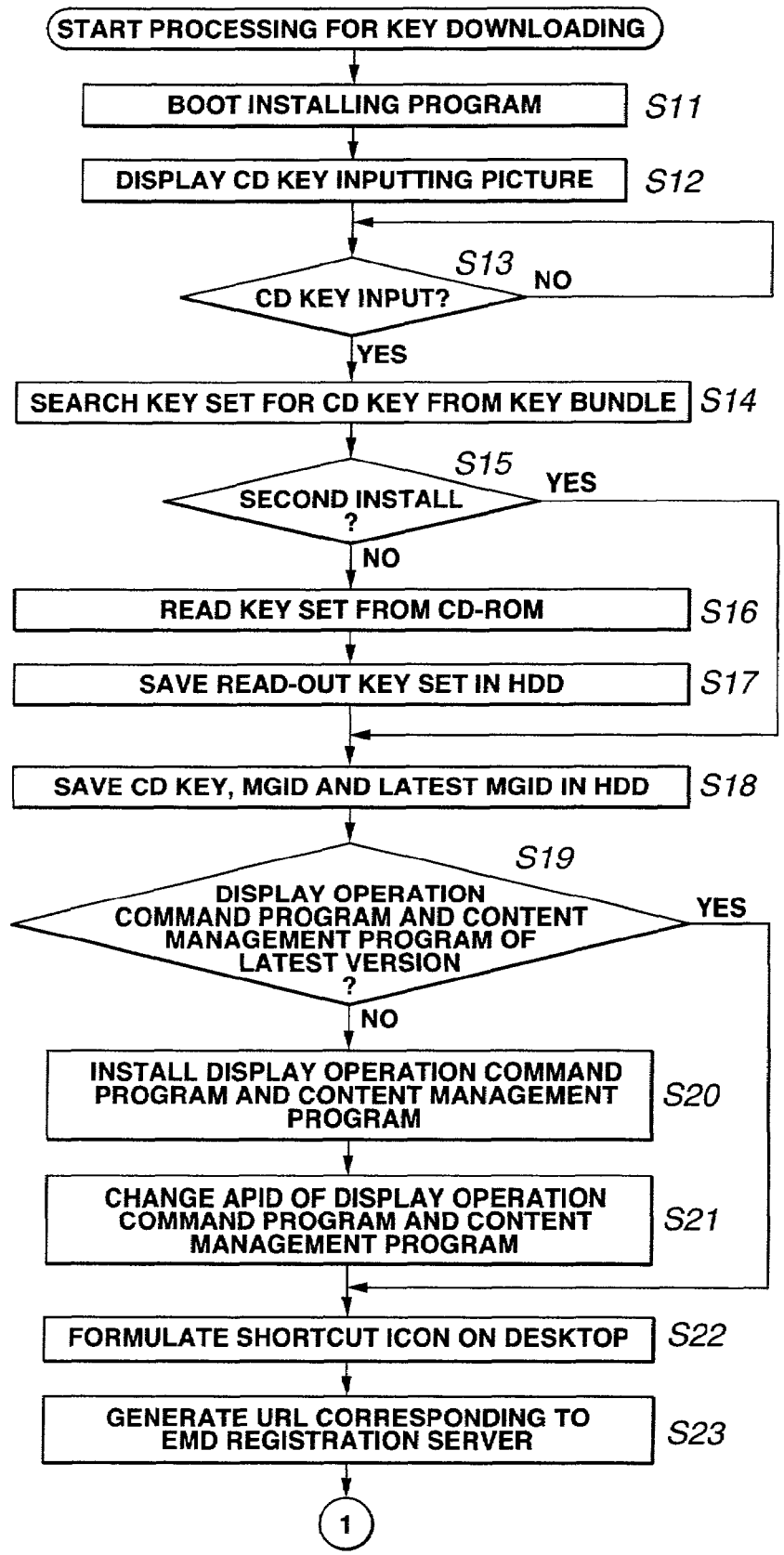
FIG. 24 is a flowchart for illustrating the processing for downloading a key.
Figure 25:
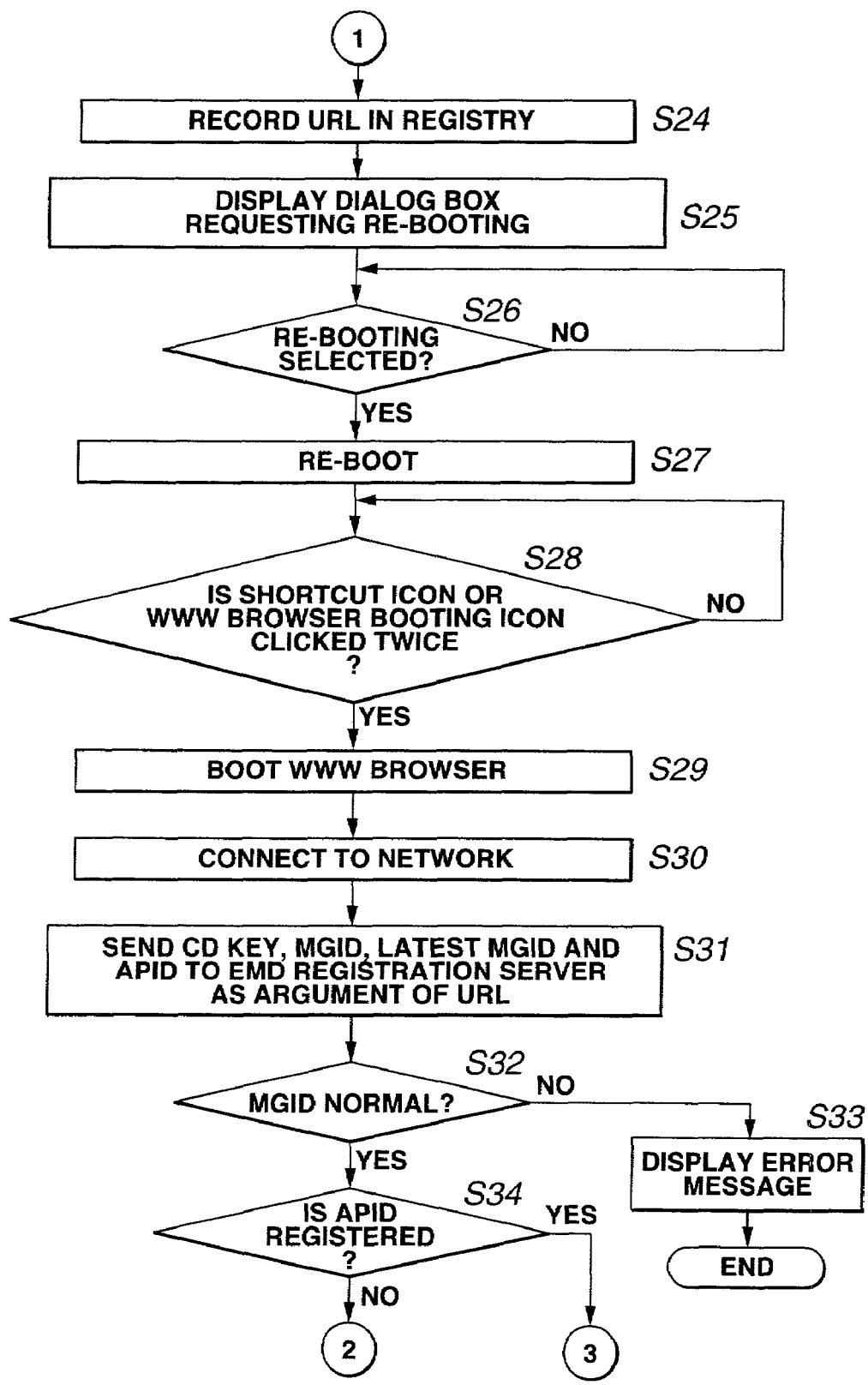
FIG. 25 is a flowchart for illustrating the processing for downloading a key.
Figure 26:
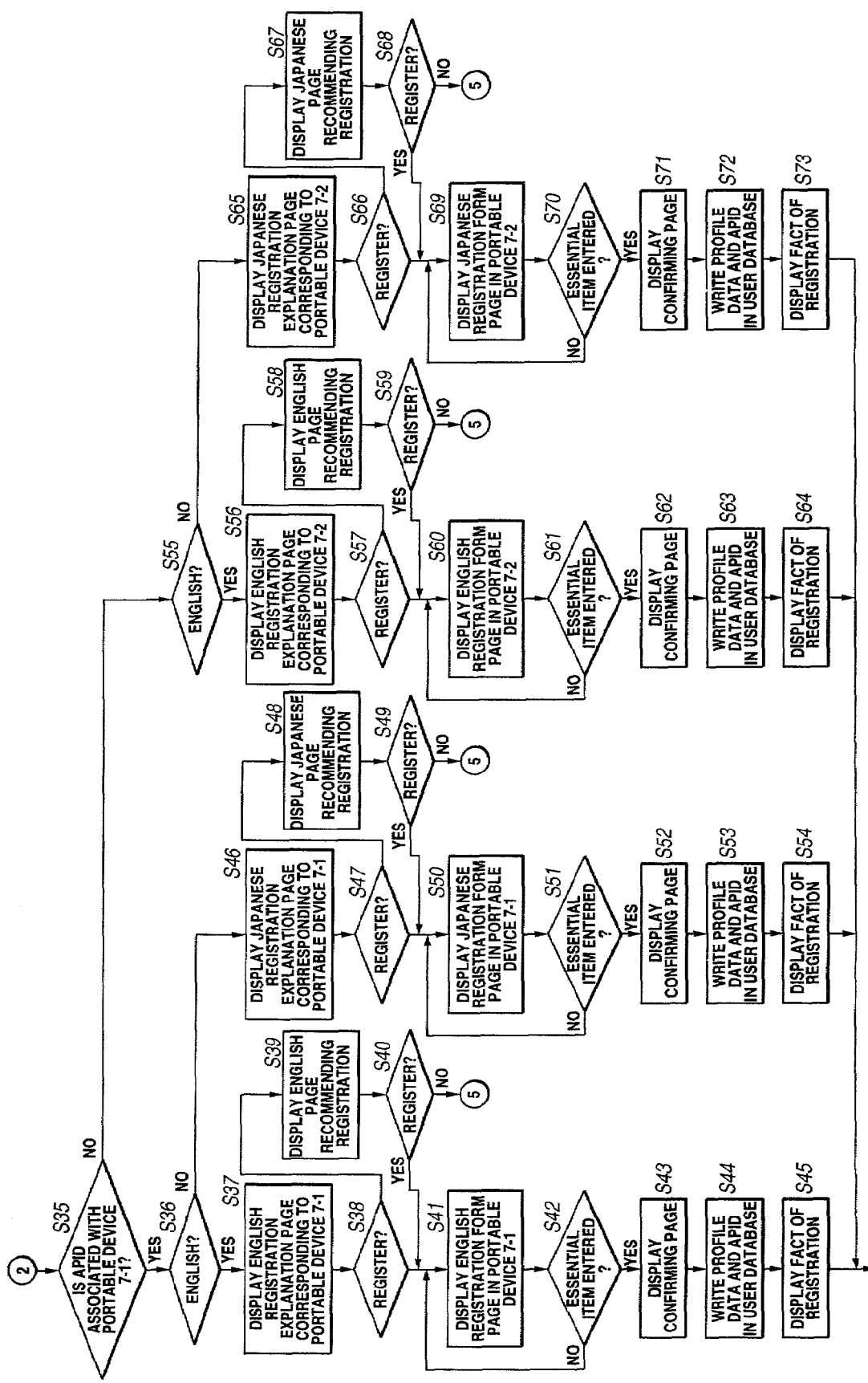
FIG. 26 is a flowchart for illustrating the processing for downloading a key.
Figure 27:
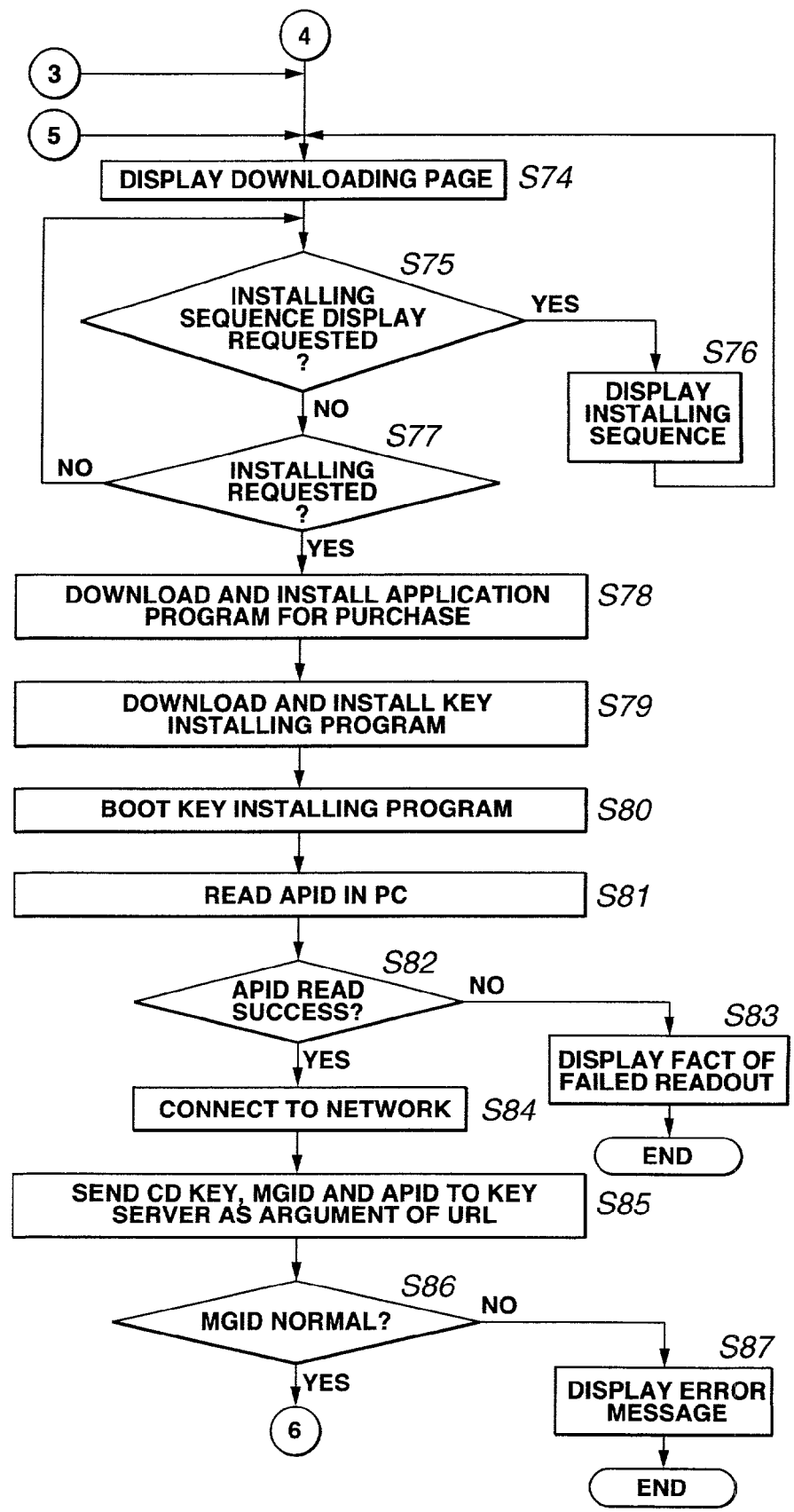
FIG. 27 is a flowchart for illustrating the processing for downloading a key.
Figure 28:
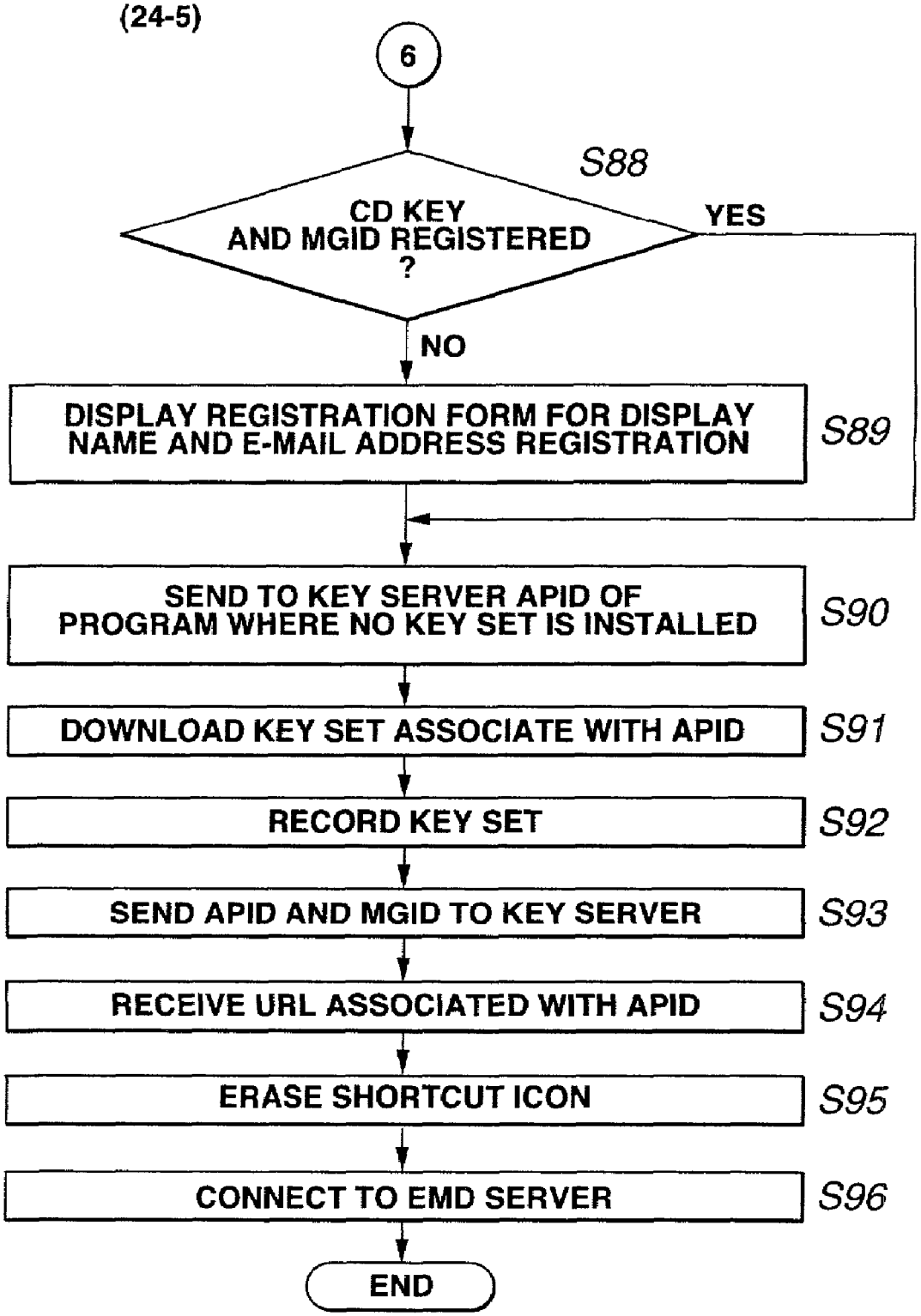
FIG. 28 is a flowchart for illustrating the processing for downloading a key.

FIG. 23 illustrates the key necessary for reciprocal authentication of the purchasing application program 115-2 and the content management program 111, and the key for managing the contents downloaded from the EMD servers 4-3 and 4-4.

The public key for authenticating the application for purchase Cert-PK1-2 is used by the content management program 111 in the processing of authenticating the purchasing application program 115-2. The secret key for authenticating the application for purchase Cert-SK1-2 is used by the content management program 111 in the processing of authenticating the purchasing application program 115-2.

The EMD contents management key EMD-SK2 is used for supervising the contents downloaded from the EMD servers 4-3 and 4-4. Of course, the key for managing the contents downloaded from the EMD server 4-3 may be distinct from the key for managing the contents downloaded from the EMD server 4-4.

The public key for authenticating the application for purchase Cert-PK2-2 is a key used by the purchasing application program 115-2 in the processing in authenticating the content management program 111. The secret key for authenticating the content management program Cert-SK2-2 is a key used by the purchasing application program 115-2 in the processing for authenticating the content management program 111.

The key used in reciprocal authentication of the purchasing application program 115-2 and the content management program 111 and the key for managing the contents downloaded from the EMD servers 4-3 to 4-4 are inherent keys associated with the purchasing application program 115-2 and the content management program 111 supplied from the key server 5.

If, in the following, the purchasing application program 115-1 need not be distinguished from the purchasing application program 115-2, these are simply termed purchasing application programs 115. If the key installing program 118-1 need not be distinguished from the key installing program 118-2, these are simply termed key installing programs 118.

Referring to the flowcharts shown in FIGS. 24 to 28, the processing for key downloading is explained. At step S11, when the CD-ROM, which is the optical disc 42 furnished in association with the portable device 7 is loaded on the drive 22, the personal computer 1 boots the installing program 110 recorded on the CD-ROM. At step S12, the installing program 110 causes a picture for inputting the CD key to be demonstrated on the display 20.

At step S13, the installing program 110 verifies whether or not the CD key has been input. If it is found that the CD key has not been input, the processing of step S13 is repeated until the CD key is input.

At step S13, if it is verified that the CD key has been input, the installing program 110 proceeds to step S14 where the installing program 110 searches a key set associated with the CD key from a key bundle recorded on the CD-ROM.

At step S15, the installing program 110 checks whether or not the installing operation is the second or any subsequent installing operation. If it is verified that the installing operation is not the second or any subsequent installing operation, the installing program 110 proceeds to step S16 to read out from the CD-ROM the key set searched at step S14. At step S17, the installing program 110 saves the key as read-out in the HDD 21.

If it is found at step S15 that the installing operation is the second or any subsequent installing operation, the steps S16 and S17 are skipped. The installing program 110 proceeds to step S18.

At step S18, the installing program 110 saves the CD key, MGID and Latest MGID in the HDD 21.

At step S19, the installing program 110 checks whether or not the display operation command program 112 and the content management program 111, already installed in the personal computer 1, are latest ones. If it is verified that any one of the display operation command program 112 and the content management program 111 installed in the personal computer 1 are not latest ones, the installing program 110 proceeds to step S20 to install the display operation command program 112 and the content management program 111 recorded on the CD-ROM on the personal computer 1.

At step S21, the installing program 110 updates the APID associated with the display operation command program 112 and the APID associated with the content management program 111. The installing program 110 then proceeds to step S22.

If it is verified at step S19 that both of the display operation command program 112 and the content management program 111 installed in the personal computer 1 are latest ones, the steps S20, S21 are skipped. The program then moves to step S22.

At step S22, the installing program 110 formulates a shortcut icon for booting the WWW browser 117 on the desktop. At step S23, the installing program 110 generates a URL associated with the EMD registration server 3. in the URL, generated at step S23, the CD key, MGID, Latest MGID and APID$_{OMG}$ are set as arguments. At step S24, the installing program 110 records the generated URL in the registry.

At step S25, the installing program 110 displays a dialog box requesting re-booting.

At step S26, the installing program 110 verifies whether or not the re-booting has been selected. If it is verified that the re-booting has not been selected, the program reverts to step S26 to repeat the processing of step S26 until re-booting is selected.

If it is verified at step S26 that the re-booting has been selected, the program reverts to step S27 where the installing program 110 executes the re-booting.

At step S28, an operating system, not shown, of the personal computer 1 verifies whether or not the icon for booting the shortcut icon or the WWW browser 117 has been double-clicked. If it is verified that the none of the shortcut icon nor the icon for booting the WWW browser 117 has been double-clicked, the processing of step S28 is repeated until a shortcut icon or an icon for booting the WWW browser 117 is double-clicked.

If it is verified that the one of the shortcut icon and the icon for booting the WWW browser 117 has been double-clicked, the program moves to step S29 where the operating system boots the WWW browser 117.

At step S31, the WWW browser 117 transmits the CD key, MGID, Latest MGID and APID$_{OMG}$, as an argument of the URL, to the EMD registration server 3.

At step S32, the EMD registration server 3 verifies whether or not the MGID received from the WWW browser 117 is normal, such as whether or not the number of digits is 20. If it is verified that the MGID is not normal, the program moves to step S33 where the personal computer 1 displays an error message to finish the processing.

If, at step S32, the MGID is verified to be normal, the EMD registration server 3 verifies whether or not APID$_{OMG}$ has been registered in the user database 8, in association with the CD key and MGID. If it is verified that the APID$_{OMG}$ has not been registered in the user database 8, the program moves to step S35 to check whether or not the APID$_{OMG}$ copes with the portable device 7-1.

If, at step s35, it is found that the APID$_{OMG}$ copes with the portable device 7-1, the program moves to step S36 where the EMD registration server 3 verifies whether or not the language code of the APID$_{OMG}$ is English. If it is verified that the language code of the APID$_{OMG}$ is English, the program moves to step S37 to transmit data for displaying the corresponding registration explanation page in English associated with the portable device 7-1 to the WWW browser 117 of the personal computer 1 to cause the WWW browser 117 to display the corresponding registration explanation page in English associated with the portable device 7-1. This displays the corresponding registration explanation page in English associated with the portable device 7-1 in the WWW browser 117.

At step S38, the EMD registration server 3 verifies whether or not registration is to be made, based on the data transmitted from the WWW browser 117. If it is verified that registration is not to be made, the program moves to step S39 to transmit the data for demonstrating recommendations for registration in English to cause a dialog box recommending registration in English to be displayed in the WWW browser 117.

At step S40, the EMD registration server 3 verifies whether or not registration is to be made, based on data transmitted from the WWW browser 117. If it is verified that registration is not to be made, the program moves to step S74.

If it is verified at step S40 that registration is to be made, the program moves to step S41.

If it is verified at step S38 that registration is to be made, or if it is verified at step S40 that registration is to be made, the program moves to step S41 where data for displaying the registration form in English corresponding to the portable device 7-1 is transmitted to the WWW browser 117 of the personal computer 1 to cause the WWW browser 117 to display the registration form in English corresponding to the portable device 7-1.

At step S42, the EMD registration server 3 verifies whether or not essential items of the registration form have been entered, based on data transmitted from the WWW browser 117. If it is verified that essential items of the registration form have not been entered, the program reverts to step S41 to repeat the processing of displaying the registration form in English for the portable device 7-1 on the WWW browser 117.

If it is verified at step S42 that the essential items of the registration form have been entered, the program moves to step S43 to transmit data displaying a page for verifying the registered contents to the WWW browser 117 of the personal computer to display a page of confirmation of the registered contents in the WWW browser 117.

At step S44, the EMD registration server 3 causes the user profile and the APID to be written in the user database 8. At step S45, the EMD registration server 3 transmits the data for displaying the fact of the registration to the WWW browser 117 of the personal computer 1 to cause the fact of the registration to be displayed on the WWW browser 117.

If the language code of $APID_{OMG}$ is verified at step S36 to be Japanese, the program moves to step S46, where the EMD registration server 3 transmits data for displaying the page of registration explanation in Japanese corresponding to the portable device 7-1 to the WWW browser 117 of the personal computer 1 to cause the corresponding page of registration explanation in Japanese corresponding to the portable device 7-1 to be displayed on the WWW browser 117.

At step S47, the EMD registration server 3 checks whether or not registration is to be made, based on data transmitted from the WWW browser 117. If it is verified that registration is not to be made, the program moves to step S48 to transmit the data for displaying the fact of recommendation for registration in Japanese to the WWW browser 117 to cause a dialog box recommending the registration to be displayed on the WWW browser 117.

At step S49, the EMD registration server 3 verifies whether or not registration is to be made, based on data transmitted from the WWW browser 117. If it is verified that registration is not to be made, the program moves to step S74.

If it is verified at step S49 that registration is to be made, the program moves to step S50.

If it is verified at step S47 that registration is to be made, or if it is verified at step S49 that registration is to be made, the program moves to step S50 to transmit data for displaying the registration form in Japanese corresponding to the portable device 7-1 to the WWW browser 117 of the personal computer 1 to cause the registration form in Japanese corresponding to the portable device 7-1 to be displayed on the WWW browser 117.

At step S51, the EMD registration server 3 verifies whether or not the essential items of the registration form have been entered, based on data transmitted from the WWW browser 117. If it is verified that the essential items of the registration form have not been entered, the program reverts to step S50 to repeat the processing of causing the processing of displaying the registration form in Japanese corresponding to the portable device 7-1 to be displayed on the WWW browser 117.

If it is verified at step S51 that the essential items of the registration form have been entered, the program moves to step S52 where the EMD registration server 3 transmits data for displaying a page of confirmation of the contents of registration to the WWW browser 117 of the personal computer 1 to cause the page of confirmation of the contents of registration to be displayed on the WWW browser 117.

At step S53, the EMD registration server 3 causes the user profile and the APID to be written in the user database 8. At step S54, the data for displaying a page of confirmation of the contents of registration is transmitted to the WWW browser 117 of the personal computer 1 to cause the fact of registration to be displayed on the WWW browser 117.

If it is verified at step S35 that the $APID_{OMG}$ corresponds to the portable device 7-2, the program moves to step S55 where the EMD registration server 3 checks whether or not the language code of the $APID_{OMG}$ is English.

If it is verified at step S55 that the language code of the $APID_{OMG}$ is English, the program moves to step S56 where the EMD registration server 3 transmits to the WWW browser 117 of the personal computer 1 the data for displaying the page of explanation of registration in English corresponding to the portable device 7-2 to cause the page of explanation of registration in English corresponding to the portable device 7-2 to be displayed on the WWW browser 117.

Based on the data transmitted from the WWW browser 117, the EMD registration server 3 verifies whether or not the registration is to be made. If it is found that the registration is not to be made, the program moves to step S58 to transmit the data for displaying the recommendation for registration in English to the WWW browser 117 of the personal computer 1 to cause the dialog box recommending the registration of registration in English to be displayed on the WWW browser 117.

At step S59, the EMD registration server 3 verifies whether or not registration is to be made, based on data transmitted from the WWW browser 117. If it is verified that registration is not to be made, the program moves to step S74.

If it is verified at step S59 that registration is to be made, the program moves to step S60.

If it is verified at step S57 that registration is to be made, or if it is verified at step S59 that registration is to be made, the program moves to step S60 to transmit data for displaying the registration form corresponding to the portable device 7-2 in English to the WWW browser 117 of the picture printing system 1 to cause the registration form corresponding to the portable device 7-2 in English to be displayed on the WWW browser 117.

The EMD registration server 3 at step S61 verifies whether or not the essential items of the registration form have been entered, based on the data transmitted from the WWW browser 117. If it is verified that the essential items of the registration form have not been entered, the program reverts to step S60 to repeat the processing of displaying the registration form corresponding to the portable device 7-2 in English on the WWW browser 117.

If it is found at step S61 that the essential items of the registration form have been entered, the program moves to step S62 where the EMD registration server 3 transmits the data for displaying the page for confirmation of the registered contents to the WWW browser 117 of the personal computer 1 to cause the page for confirmation of the registered contents to be displayed on the WWW browser 117.

At step S63, the EMD registration server 3 causes the user profile and the APID to be written in the user database 8. At step S64, the EMD registration server 3 transmits the data for displaying the fact of registration to the WWW browser 117 of the personal computer 1 to display the fact of registration on the WWW browser 117.

If it is verified at step S55 that the language code of the $APID_{OMG}$ is Japanese, the program moves to step S65 where the EMD registration server 3 transmits the data for displaying the page for explanation of registration in Japanese to the WWW browser 117 of the personal computer 1 to cause the page for explanation of registration in Japanese corresponding to the portable device 7-2 to be displayed on the WWW browser 117.

At step S66, the EMD registration server 3 verifies whether or not registration is to be made, based on data transmitted from the WWW browser 117. If it is verified that registration is not to be made, the program moves to step S67 to transmit the data for displaying the recommendations for registration in Japanese to the WWW browser 117 to display the dialog box recommending the registration on the WWW browser 117.

At step S68, the EMD registration server 3 verifies whether or not registration is to be made, based on data transmitted from the WWW browser 117. If it is verified that registration is not to be made, the program moves to step S74.

If it is verified at step S68 that registration is to be made, the program moves to step S69.

If it is verified at step S66 that registration is to be made, or if it is verified at step S68 that registration is to be made, the program moves to step S69 to transmit the data for displaying the registration form in Japanese corresponding to the portable device 7-2 to cause the registration form in Japanese corresponding to the portable device 7-2 to be displayed on the WWW browser 117.

The EMD registration server 3 at step S70 verifies whether or not the essential items of the registration form have been entered, based on the data transmitted from the WWW browser 117. If it is verified that the essential items of the registration form have not been entered, the program reverts to step S69 to repeat the processing of displaying the registration form corresponding to the portable device 7-2 in English on the WWW browser 117.

If it is found at step S70 that the essential items of the registration form have been entered, the program moves to step S71 where the EMD registration server 3 transmits the data for displaying the page for confirmation of the registered contents to the WWW browser 117 of the personal computer 1 to cause the page for confirmation of the registered contents to be displayed on the WWW browser 117.

At step S72, the EMD registration server 3 causes the user profile and the APID to be written in the user database 8. At step S73, the EMD registration server 3 transmits the data for displaying the fact of registration to the WWW browser 117 of the personal computer 1 to display the fact of registration on the WWW browser 117.

At step S74, the EMD registration server 3 transmits data indicating URL corresponding to the installer server 6 to the WWW browser 117, which then receives the data indicating the URL corresponding to the installer server 6 for coupling to the installer server 6. The installer server 6 transmits data for displaying the page for downloading to the WWW browser 117 of the personal computer 1 to display the page for downloading on the WWW browser 117.

Based on the data transmitted from the WWW Browser 117, the installer server 6 at step S75 verifies whether or not the display of the installing sequence has been requested. If it is verified that the display of the installing sequence has been requested, the installer server 6 proceeds to step S76 to transmit the data for demonstrating the installing sequence to the WWW browser 117 of the personal computer 1 to cause the installing sequence to be demonstrated on the WWW browser 117. The installer server 6 then reverts to step S74.

If it is verified at step S75 that the display of the installing sequence has not been requested, the installer server 6 proceeds to step S77 where the installer server 6 verifies, based on the data transmitted from the WWW browser 117, whether or not the installation has been requested.

If it has been verified that the installation is not requested at step S77, the installer server 6 reverts to step S75 to repeat the processing of verifying whether or not the display of the installing sequence has been requested.

If it is verified at step S77 that installation has been requested, the installer server 6 moves to step S78 where the installer server 6 causes the WWW browser 117 to download and install the purchasing application program 115 associated with the portable device 7. At step S79, the installer server 6 causes the WWW browser 117 to download and install the key installing program 118.

At step S80, the WWW browser 117 boots the key installing program 118. At step S81, the key installing program 118 reads out the APID in the personal computer 1.

At step S82, the key installing program 118 verifies whether or not the APID in the personal computer 1 has been read out in success. If it is found that the APID readout has resulted in failure, the installer server 6 moves to step S83 to display that the APID readout has resulted in failure to finish the processing.

If it is verified at step S82 that APID readout is successful, the installer server 6 proceeds to step S84 where the key installing program 118 connects to the network 2.

At step S85, the key installing program 118 transmits the CD key, MGID, $APID_{PL}$ and $APID_{OMG}$, as an argument of the URL, to the key server 5.

At step S86, the key server 5 verifies whether or not the received MGID is normal, for example, has the number of digits equal to 20. If it is found that the MGID is not normal, the installer server 6 moves to step S87 to cause the personal computer 1 to display an error message to finish the processing.

If it is verified at step S86 that the MGID is normal, the installer server 6 moves to step S88 where the key server 5 makes an inquiry whether or not the CD key and the MGID as received have been registered. If it is fount that no registration of the CD key nor the MGID has been made by the EMD registration server 3, the installer server 6 moves to step SHUTTER MEMBER 89 to cause the key installing program 118 to cause the registration form to be displayed by the key installing program 118 for registering the name and the E-mail address. If no registration of the CD key nor the MGID has been made, the processing is finished.

If the name and the E-mail address have been registered at step Shutter member 89 or it is verified at step S88 that the CD key and the MGID have been registered, the key installing program 118-1 transmits to the key server 5 the APID associated with "false" indicating that a key necessary for downloading the key has not been installed. At step S91, the key installing program 118 downloads the key set associated with the program the key set of which has not been installed from the key server 5.

At step S92, the key installing program 118 records the downloaded key in the HDD 21. At step S93, the key installing program 118 transmits the MGID and $APID_{OMG}$ to the key server 5. At step S94, the key installing program 118 receives the URL associated with one of the EMD servers 4-1 to 4-4 and associated with the $APID_{OMG}$. The key installing program 118-1 records the received key to associate the APID transmitted at step S90 "true" indicating that no key necessary in content downloading has been installed.

At step S95, the key installing program 118-1 erases a shortcut icon on the desktop. At step S96, the WWW browser 117 accesses one of the EMD servers 4-1 to 4-4, based on the URL set at step S94, to finish the processing.

Thus, in registration, the personal computer 1 is able to acquire the key necessary in downloading the contents from the EMD servers 4-1 to 4-4 without the user specifying the key type etc. If no registration is made, the personal computer 1 is unable to acquire the key necessary in downloading the contents from the EMD servers 4-1 to 4-4.

The key furnished by the key server 5 to the personal computer 1 is a key inherent to each of the content management program 111 and the purchasing application program 115.

After acquiring the key necessary for downloading the contents from the EMD servers 4-1 to 4-4, the personal computer 1 is able to connect to one of the EMD servers 4-1 to 4-4 associated with the user language or the attributes of the portable device 7, without requesting the user setting.

Figure 29:
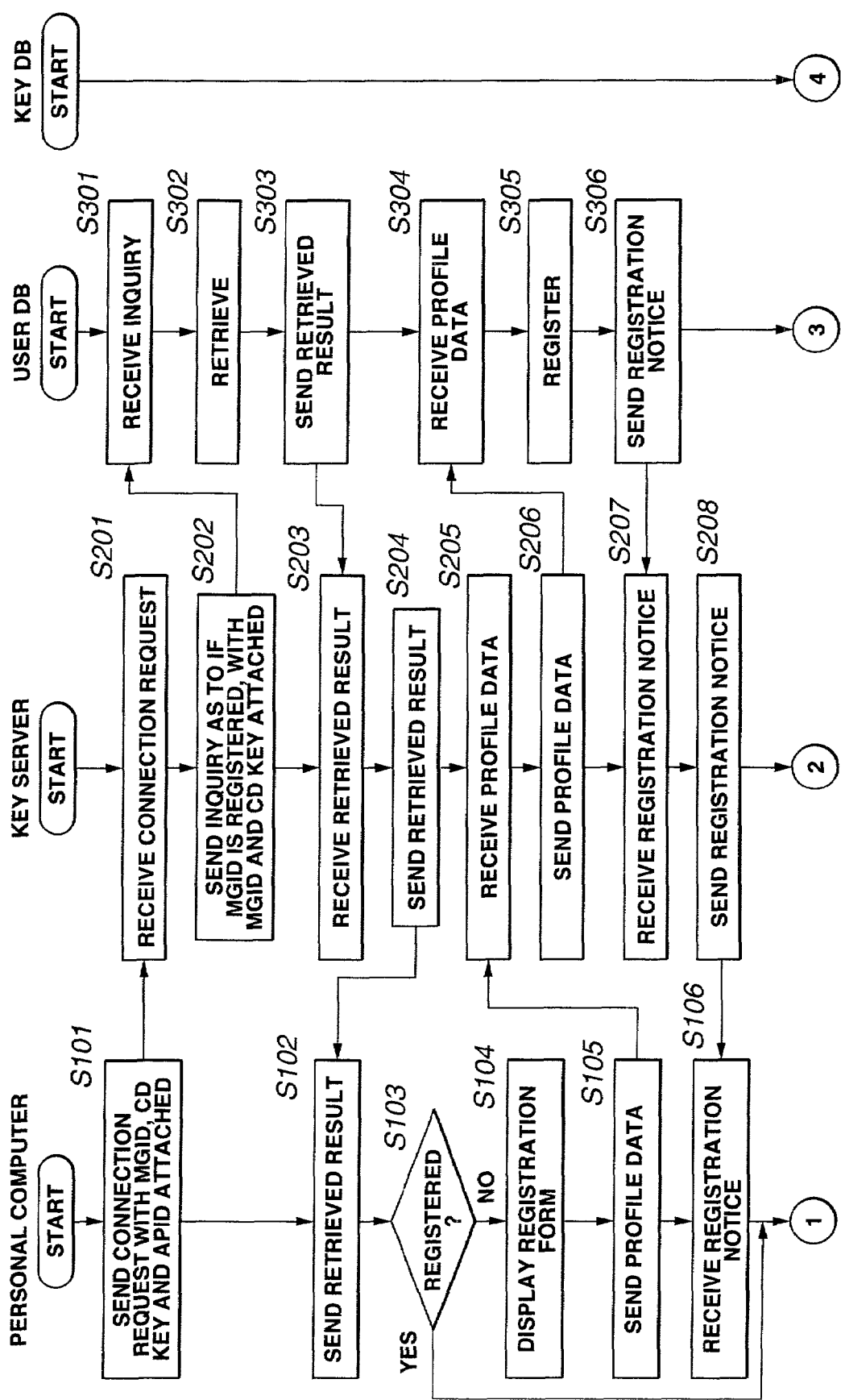
FIG. 29 is a flowchart for illustrating details in the processing for key downloading.

Referring to the flowchart of FIGS. 29 and 30, the processing for key downloading corresponding to the processing of steps S84 to S94 is explained in detail.

At step S101, the key installing program 118 of the personal computer 1 transmits connection request to the key server 5 as the CD key, MGID, $APID_{PL}$ and $APID_{OMG}$, as an argument of the URL, are attached, to transmit the connection request to the key server 5.

At step S201, the key server 5 receives connection request from the key installing program 118. At step S202, the key server 5 transmits an inquiry whether or not the MGID has been registered, by attaching the CD key and the MGID to the user database 8 through the EMD registration server 3.

At step S301, the user database 8 receives an inquiry from the key server 5 through the EMD registration server 3. At step S302, the user database 8 retrieves whether or not the MGID has been retrieved, based on the CD key and the MGID. At step S303, the user database 8 transmits the retrieved result as to whether or not the MGID has been registered through the EMD registration server 3 to the key server 5.

At step S203, the key server 5 receives the retrieved results from the user database 8 indicating whether or not the MGID has been registered. At step S204, the key server 5 transmits the retrieved results indicating as to whether or not the MGID has been registered to the key installing program 118 of the personal computer 1.

At step S102, the key installing program 118 of the personal computer 1 receives the retrieved results from the key server 5 indicating whether or not the MGID has been registered. At step S103, the key installing program 118 verifies whether or not registration has been made, based on the retrieved results, received at step S102, indicating whether or not the MGID has been registered. If it is found that no registration has been made, the key installing program 118 moves to step S104 to display the registration form shown in FIG. 13. If the name or the E-mail address has been input on the registration form, the key installing program 118 at step S105 transmits the profile data, such as name or the E-mail address to the key server 5.

At step S205, the key server 5 receives profile data, such as name or the E-mail address, transmitted from the key installing program 118. At step S206, the key server 5 transmits profile data, such as name or the E-mail address, through the EMD registration server 3 to the user database 8.

At step S304, the user database 8 receives the profile data, such as name or the E-mail address, transmitted from the key server 5, through the EMD registration server 3. At step S305, the user database 8 registers the profile data, such as name or the E-mail address, in association with the CD key and the MGID acquired at step S301. At step S306, the user database 8 transmits the notification of registration to the key server 5 through the EMD registration server 3.

At step S207, the key server 5 receives the notification of registration transmitted from the user database 8. At step S208, the key server 5 transmits the notification of registration to the key installing program 118 of the personal computer 1.

At step S106, the key installing program 118 of the personal computer 1 receives the notification of registration transmitted from the key server 5 and then proceeds to step S107.

If it is verified at step S103 that registration has been made, there is no necessity of processing for registration. So, the key installing program 118 moves to step S107.

At step S107, the key installing program 118 transmits the APID of the program, for which no key has been installed, to the key server 5.

At step S209, the key server 5 receives the APID transmitted from the key installing program 118. At step S210, the key server 5 requests the key database 9 to issue a key based on the APID.

At step S401, the key database 9 receives the request of issuance of the key as well as the APID. At step S402, the key database 9 issues a key (inherent key) associated with the APID. At step S403, the key database 9 transmits the issued key to the key server 5.

At step S211, the key server 5 receives the key from the key database 9. At step S212, the key server 5 transmits the key received at step S211 to the key installing program 118 of the personal computer 1.

At step S108, the key installing program 118 of the personal computer 1 receives the key transmitted from the key server 5. At step S109, the key installing program 118 saves the key received at step S109 in a pre-set file in the HDD 21. The key installing program 118-1 makes setting that the key has been installed in the associated APID.

At step S213, the key server 5 at step S202 verifies, based on the CD key and the MGID acquired, whether or not a new key set comprising a new master key MGMK, a new personal key MGIK and a new storage key Rip-SK, is to be transmitted. For example, the purport of issuing a new key set when one of the new master key MGMK, new personal key MGIK and the new storage key Rip-SK has been broken is set in advance in the key server 5, whereby the key server 5 automatically updates the master key MGMK, personal key MGIK and the storage key Rip-SK in the personal computer having the pre-set CD key and the MGID.

If it is verified at step S213 that a new key set is to be transmitted, the key server 5 moves to step S214 to transmit a new key set to the key installing program 118 of the personal computer 1.

At step S110, the key installing program 118 of the personal computer 1 receives the new key set transmitted from the key server 5. At step S111, the key installing program 118 saves the new key set, received at step S110, in a pre-set file of the HDD 21.

If it is verified at step S213 that the new key set is not to be transmitted, the steps S214, S110 and S111 are skipped.

At step S112, the key installing program 118 of the personal computer 1 transmits the $APID_{OMG}$, as the APID of the content management program 111, to the key server 5.

At step S215, the key server 5 receives the $APID_{OMG}$. At step S216, the key server 5 retrieves the attributes of the $APID_{OMG}$ and the associated table of the URL, previously recorded, based on the received $APID_{OMG}$, to select the pre-set URL to transmit the select3ed URL to the key installing program 118 of the personal computer 1.

At step S113, the key installing program 118 of the personal computer 1 receives the URL transmitted from the key server 5. At step S114, the key installing program 118 of the personal computer 1 saves the URL received at step S113 in a pre-set file, such as registry, to finish the processing.

The personal computer is able to acquire the key necessary in downloading the contents from the EMD servers 4-1 to 4-4, as described above.

Although the above-described sequence of operations can be executed by a hardware, it can also be executed by the software. If the sequence of the processing operations are executed by the software, the a program forming the software is installed from a program storage medium to a computer built into a dedicated hardware or a general-purpose personal computer on which a variety of programs can be installed to execute various functions.

The program storage medium for storing the program installed on a computer so as to be executed by the computer may be realized by a magnetic disc 41 or 91, inclusive of a floppy disc, an optical disc 42 or 92 (CD-ROM)(Compact Disc-Read-Only Memory), or a DVD (Digital Versatile Disc)), a magneto-optical disc 43 or 93, including a MD (Mini-Disc), a package medium, such as semiconductor memory 44 or 94, a ROM 12 or 62 in which the program can be stored transiently or permanently, or a HDD 21 or 71, as shown in FIGS. 2 and 3. The storage of the program in the program storage medium is carried out using a wired or wireless communication medium, such as digital satellite broadcast, over a network 2, such as Local Area Network or Internet, through an interface, such as communication unit 25 or 73.

In the present specification, the steps stating the program stored in the program storage medium includes not only the processing carried out chronologically in accordance with the stated sequence but also processing carried out in parallel or individually without being executed chronologically.

In the present specification, the system means the entire apparatus realized by plural devices.

The invention claimed is:

1. An information providing system comprising: a registration apparatus comprising
    first recording means for recording user registration form data for displaying a picture for inputting user profile data specifying a user for registration, in association with attributes relevant to said user,
    first receiving means for receiving, from a user terminal used by said user, a transmission request for transmission of said user registration form data, along with user terminal identification specifying said user terminal as an argument of a target destination of the registration apparatus and said attributes input by said user,
    selection means for selecting said user registration form data recorded in said first recording means, based on said attributes received by said first receiving means,
    first transmission means for transmitting said user registration form data selected by said selection means to said user terminal,
    second receiving means for receiving said user profile data which specifies said user and which has been input from said user terminal based on said user registration form data, and
    second recording means for recording said user profile data in association with said user terminal identification specifying said user terminal used by said user;
    second transmitting means for transmitting a program for access to a key server; and
    a key server and content server, the key server comprising memory;
    third receiving means for receiving the user terminal identification and an application identification corresponding to an application from the user terminal, the application identification including information corresponding to application type, language and software version code of the application;
    verifying means for verifying registration of the user terminal by comparing the user terminal identification received by the third receiving means with the user terminal identification stored by the second recording means;
    generating means for generating a key, used by the application to enable access to downloaded content from the content server, based on the application identification received by the third receiving means, and
    third transmission means for transmitting the key and a target destination of the content server which enables the user terminal to download contents from said content server.

2. The information providing system according to claim 1 wherein the attributes include information indicating a language.

3. The information providing system according to claim 1 wherein the attributes include information indicating a terminal device connected to said user terminal.

4. An information providing method comprising:
    a first recording step of recording user registration form data for displaying a picture for inputting user profile data specifying a user for registration, in association with attributes relevant to said user;
    a first receiving step of receiving, from a user terminal used by said user, a transmission request for transmission of said user registration form data, along with user terminal identification specifying said user terminal as an argument of a target destination of a registration apparatus and said attributes input by said user;
    a selection step of selecting said user registration form data recorded in said first recording step, based on said attributes received by said first receiving step;
    a first transmission step of transmitting said user registration form data selected by said selection step to said user terminal;
    a second receiving step of receiving said user profile data which specifies said user and which has been input from said user terminal based on said user registration form data;
    a second recording step of recording said user profile data in association with said user terminal identification specifying said user terminal used by said user;
    a second transmitting step of transmitting a program for access to a key server;
    a third receiving step of receiving at the key server the user terminal identification and an application identification corresponding to an application from the user terminal used by said user, the application identification including information corresponding to application type, language and software version code of the application;
    a verifying step of verifying registration of the user terminal by comparing the user terminal identification received by the third receiving step with the user terminal identification stored by the second recording step;
    a generating step of generating a key used by the application to enable access to downloaded content from a content server based on the application identification received by the third receiving step; and
    a third transmission step of transmitting from the key server the key and a target destination of said content server which enables the user terminal used by said user to download contents from said content server.

5. A program storage medium having stored therein a computer-readable program which said program comprises:

a first receiving step of receiving, from a user terminal used by a user, a transmission request for transmission of user registration form data, along with a user terminal identification specifying said user terminal as an argument of a target destination of a registration apparatus used by said user and attributes relevant to said user, said user registration form data including a picture for inputting user profile data specifying said user;

a selection step of selecting said user registration form data based on said attributes received by said first receiving step;

a first transmission step of transmitting said user registration form data selected by said selection step to said user terminal;

a second receiving step of receiving said user profile data which specifies said user and which has been input from said user terminal based on said user registration form data;

a second recording step of recording said user profile data in association with said user terminal identification specifying said user terminal used by said user;

a second transmitting step of transmitting a program for access to a key server;

a third receiving step of receiving at the key server the user terminal identification and an application identification corresponding to an application from the user terminal used by said user, the application identification including information corresponding to application type, language and software version code of the application;

a verifying step of verifying registration of the user terminal by comparing the user terminal identification received by the third receiving step with the user terminal identification stored by the second recording step;

a generating step of generating a key used by the application to enable access to downloaded content from a content server based on the application identification received by the third receiving step; and a third transmission step of transmitting from the key server the key and a target destination of said content server which enables the user terminal used by said user to download contents from said content server.

6. A user terminal device comprising:

a processor;

a sending communications unit configured to send a transmission request for transmission of user registration form data along with user terminal identification information to a registration apparatus, to send user profile data to a registration server and to send the user terminal identification information and application identification corresponding to an application to a key server, the application identification including information corresponding to application type, language and software version code of the application;

a receiving communications unit configured to receive the user registration form data for displaying a picture for inputting said user profile data, to receive a program for access to the key server from the registration apparatus, to receive a key used by the application to enable access to downloaded content from a content server, the key based on the application identification and to receive a target destination of the content server from the key server;

a display configured to display the picture for inputting the user profile data specifying a user for registration, in accordance with attributes relevant to the user;

an input element configured to input the user profile data; and a download unit configured to download contents from the content server.

7. A method for receiving content using a user terminal, said method comprising:

transmitting to a registration apparatus a request for transmission of user registration form data along with user terminal identification specifying the user terminal;

receiving the user registration form data from a registration server;

displaying a picture for inputting user profile data specifying a user for registration, in accordance with attributes relevant to the user;

inputting the user profile data specifying the user for registration based on the user registration form data;

transmitting the user profile data entered by said inputting to the registration server;

receiving a program for access to a key server from the registration apparatus;

transmitting to the key server the user terminal identification specifying the user terminal and an application identification corresponding to an application, the application identification including information corresponding to application type, language and software version code of the application; and receiving from the key server a key used by the application to enable access to downloaded content from a content server, the key based on the application identification and a target destination of the content server which enables downloading of contents from the content server.

8. A program storage medium having stored therein a computer-readable program which said program comprises:

transmitting to a registration apparatus a request for transmission of user registration form data along with user terminal identification specifying a user terminal;

receiving the user registration form data from a registration server;

displaying a picture for inputting user profile data specifying a user for registration, in accordance with attributes relevant to the user;

inputting the user profile data specifying the user for registration based on the user registration form data;

transmitting the user profile data entered by said inputting to the registration server;

receiving a program for access to a key server from the registration apparatus;

transmitting to the key server the user terminal identification specifying the user terminal and an application identification corresponding to an application, the application identification including information corresponding to application type, language and software version code of the application; and receiving from the key server a key used by the application to enable access to downloaded content from a content server, the key based on the application identification and a target destination of the content server which enables downloading of contents from the content server.

9. The information providing system according to claim 1, wherein the application identification is comprised only of decimal codes.

* * * * *